(12) United States Patent
Lohmar et al.

(10) Patent No.: US 8,185,794 B2
(45) Date of Patent: May 22, 2012

(54) MEDIA CONTAINER FILE MANAGEMENT

(75) Inventors: Thorsten Lohmar, Aachen (DE); Magnus Westerlund, Kista (SE); Per Fröjdh, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 988 days.

(21) Appl. No.: 12/160,158

(22) PCT Filed: Jan. 4, 2007

(86) PCT No.: PCT/SE2007/000004
§ 371 (c)(1),
(2), (4) Date: Jul. 7, 2008

(87) PCT Pub. No.: WO2007/078252
PCT Pub. Date: Jul. 12, 2007

(65) Prior Publication Data
US 2009/0089535 A1    Apr. 2, 2009

(51) Int. Cl.
*G06F 11/00* (2006.01)
(52) U.S. Cl. ......... 714/752; 714/776
(58) Field of Classification Search ............ 714/752, 714/776, 781
See application file for complete search history.

(56) References Cited

U.S. PATENT DOCUMENTS

| | | | |
|---|---|---|---|
| 6,516,435 B1 | 2/2003 | Tsunoda | |
| 6,732,314 B1* | 5/2004 | Borella et al. | 714/752 |
| 6,850,519 B1* | 2/2005 | Saito et al. | 370/389 |
| 7,810,007 B2* | 10/2010 | Herrmann | 714/746 |
| 7,940,777 B2* | 5/2011 | Asati et al. | 370/395.52 |
| 2002/0194570 A1* | 12/2002 | Birru et al. | 714/792 |
| 2003/0031119 A1* | 2/2003 | Kim et al. | 370/200 |
| 2003/0053454 A1* | 3/2003 | Katsavounidis et al. | 370/389 |
| 2005/0102371 A1* | 5/2005 | Aksu | 709/217 |
| 2006/0291475 A1* | 12/2006 | Cohen | 370/395.42 |
| 2007/0002852 A1* | 1/2007 | Pekonen et al. | 370/389 |
| 2007/0177719 A1 | 8/2007 | Dei et al. | |
| 2009/0201805 A1* | 8/2009 | Begen et al. | 370/225 |
| 2009/0313293 A1* | 12/2009 | Setlur et al. | 707/102 |
| 2010/0023525 A1* | 1/2010 | Westerlund et al. | 707/10 |

FOREIGN PATENT DOCUMENTS

| | | |
|---|---|---|
| JP | 2000-267699 A | 9/2000 |
| JP | 2001-086153 A | 3/2001 |
| WO | WO 2004/034589 A2 | 4/2004 |

OTHER PUBLICATIONS

Toiminen. J. et al. VM of Amendment 2 to 14496-12:2005 (2$^{nd}$ edition) FLUTE hint Tracks in ISO Base Media File Format, International Organisation for Standardisation. ISP/EIC/SC29/WG11. Nice, France. Oct. 2005.

3GPP. Raptor Code Specification for MBMS File Download. 3GPP SA4 PSM Ad-Hoc #31; Tdoc S4-040230; Montreal, Canada. May 17-21, 2004.

* cited by examiner

Primary Examiner — Marc Duncan

(57) ABSTRACT

The invention teaches a media container file comprising media data organized into media source blocks. The media source blocks are partitioned into source symbols that can be processed by a forward error correction (FEC) algorithm for generation of FEC redundancy data. Information of this source block partitioning is included in the file in addition to the source blocks. The container file also comprises meta data providing an association between the media source blocks and the partitioning information. The container file can be employed by a media server in a media session for compiling media data packets to be transmitted to requesting clients without the need of extensive data processing before calculating FEC data.

30 Claims, 9 Drawing Sheets

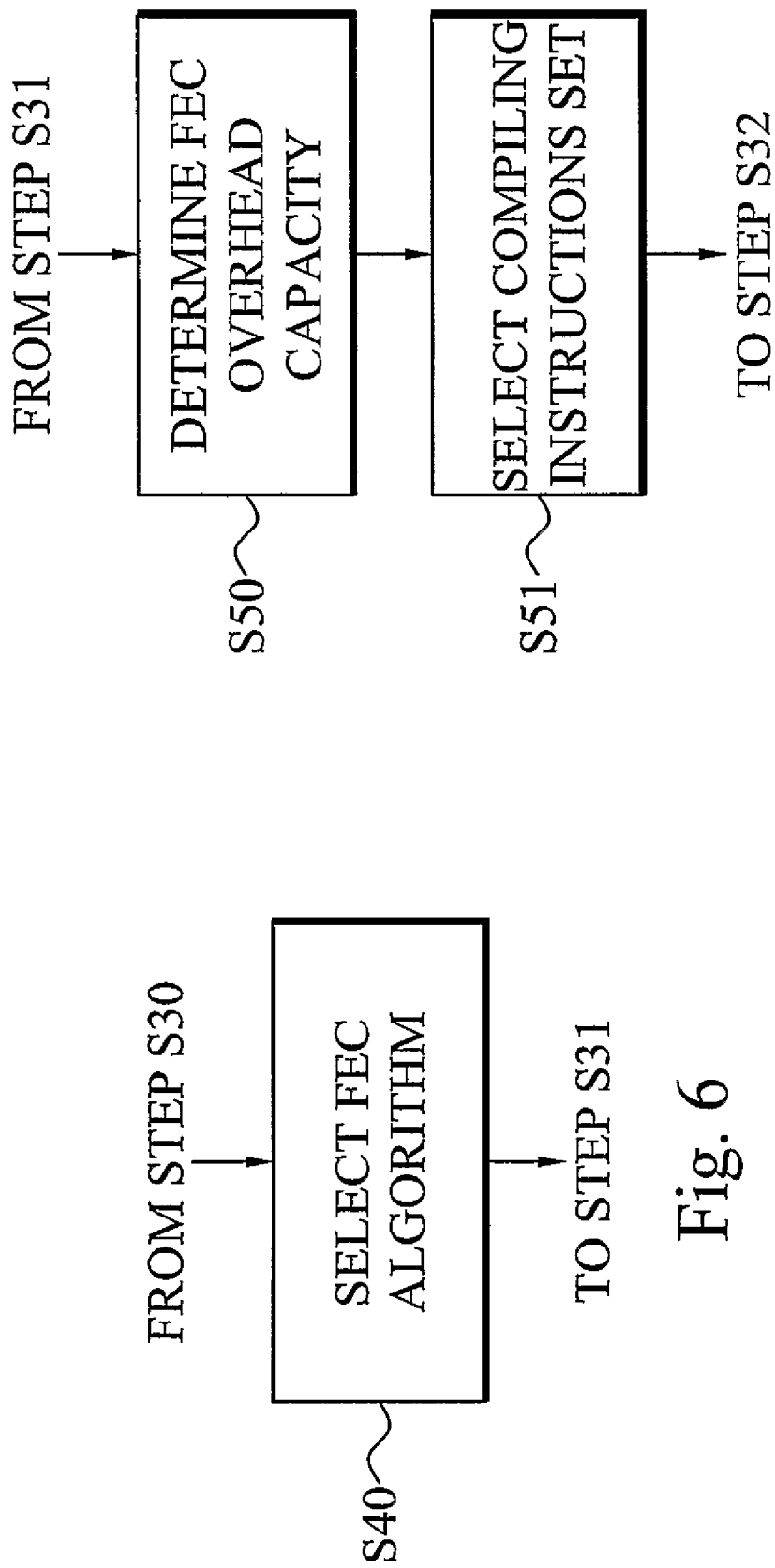

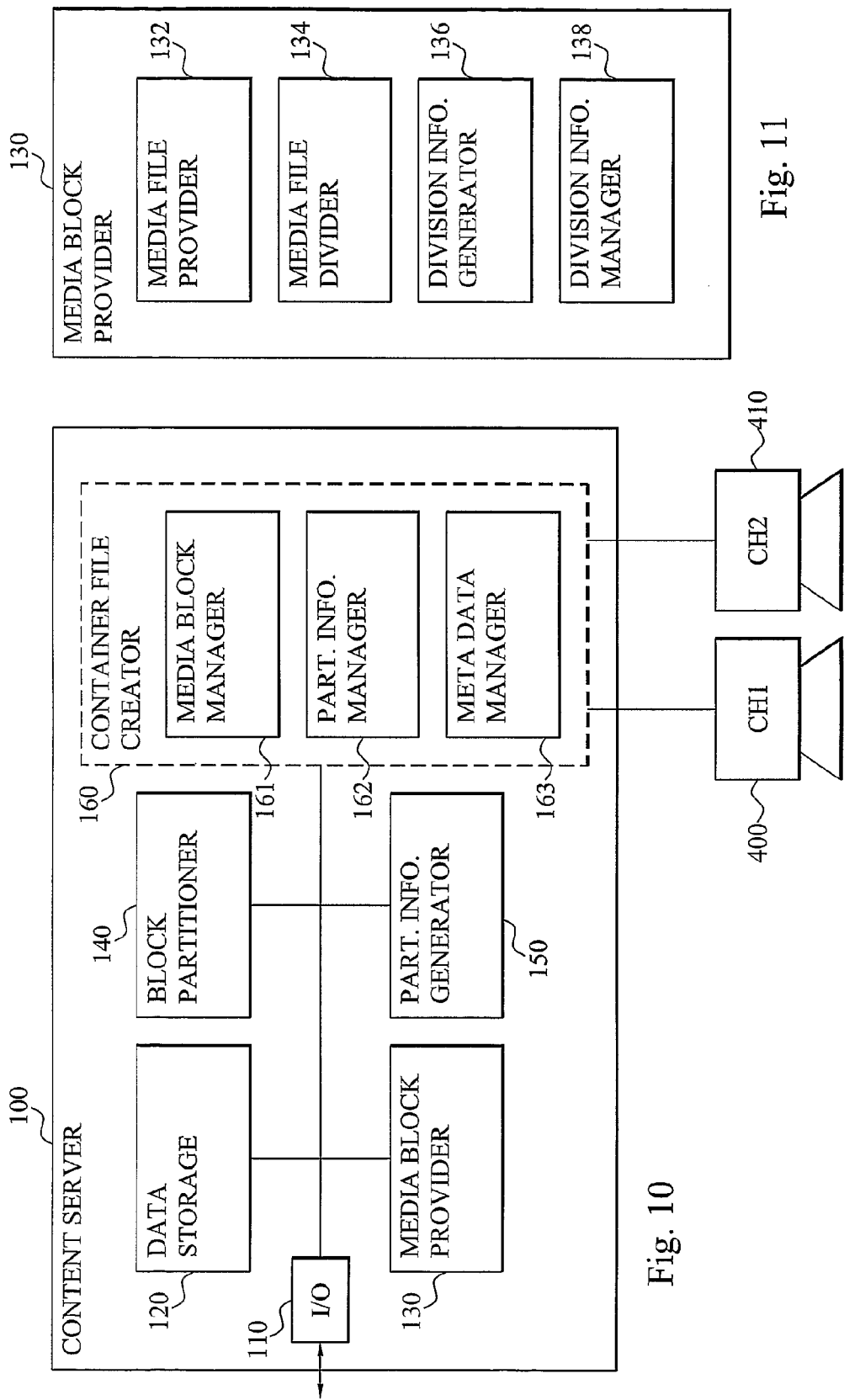

MEDIA CONTAINER FILE MANAGEMENT

TECHNICAL FIELD

The present invention generally relates to media and multimedia management, and in particular to creation and usage of media container files containing such media and multimedia content.

BACKGROUND

Media and multimedia provision to client over different networks have increased tremendously the last few years. Today, Internet is employed by numerous users for accessing and downloading media, e.g. in the form of video and audio streams or files, from media servers. This media provision has also emerged in radio-based mobile communications networks. There is currently a very big interest in using mobile networks for multimedia or TV content. This is often referred to as Mobile-TV in the art. This media provision in the mobile networks is today mainly available through unicast transport. However, at the moment, broadcast/multicast delivery methods for Mobile-TV are under development. Examples of such standardisation efforts are 3GPP Multimedia Broadcast/Multicast Services (MBMS) and European Telecommunications Standards Institute (ETSI) Digital Video broadcasting-Handheld (DVB-H).

In line with this increasing demand for media provision in different wired and wireless communications networks, there is on-going work in the development of streaming and downloading servers available in wireless networks for providing media content to requesting clients. There is a general trend towards transparent and flexible streaming/downloading servers, implying that the servers should basically consist of a multitude of "standard" modules or programmes performing different media managing functions. The input media content to these functions is then provided together with instructions of how the modules/programmes should process the content. This will provide a more flexible media provision as compared to usage of fixed, pre-defined media processing in the servers.

Thus, there is a need for a media container format that can be used in line with the trend of having transparent and flexible streaming/downloading servers.

SUMMARY

The present invention overcomes these and other drawbacks of the prior art arrangements.

It is a general object of the present invention to provide a media container file that can be used in multimedia sessions.

This and other objects are met by the invention as defined by the accompanying patent claims.

Briefly, the present invention involves generation and usage of a media container file and to devices for generating and using such a container file.

The generation of a media container file involves providing at least one media source file comprising media or multimedia data to be transmitted to requesting clients and rendered at the clients. This container file is regarded as consisting of one or more media source blocks, depending on the size of the container file. At least one such media source block is processed according to the present invention by partitioning the source block into source symbols or portions having a size allowing them to be processed by a FEC codec for the purpose of calculating FEC redundancy data or symbols based on the source block. Information of a selected block partitioning to use for the media source block is generated and stored in the container file together with the actual media content of the source block. Meta data is provided and included in the container file for providing an association between a media source block and its partitioning information.

The resulting container file can be employed by a media server during a media session for calculating, using the partitioning information in the container file, FEC data and for compiling data packets comprising media data from the file and the calculated FEC data. The pre-processing of the media source block in terms of partitioning them based on different FEC algorithms and generating FEC information included in the container file of the invention allows the media server, in a simple computationally inexpensive manner, to calculate FEC data and insert the media data and FEC data in data packets transmitted to requesting clients without extensive data processing and computationally demanding block partitionings.

In a preferred embodiment, the container file also comprises instructions that are used and followed by the media server when calculating the FEC data and when compiling data packets containing media and FEC data from the container file. In such a case, the container file comprises all the media content and instructions required for successfully being able to forward the media data in a reliable manner to the clients.

SHORT DESCRIPTION OF THE DRAWINGS

The invention together with further objects and advantages thereof, may best be understood by making reference to the following description taken together with the accompanying drawings, in which:

FIG. 6 is a flow diagram illustrating additional steps of the session managing method of FIG. 5;

FIG. 7 is a flow diagram illustrating additional steps of the session managing method of FIG. 5;

FIG. 10 is a schematic block diagram of a content server according to yet another aspect of the present invention;

FIG. 11 is a schematic block diagram illustrating an embodiment of the media block provider of FIG. 10 in more detail;

DETAILED DESCRIPTION

Figure 1:
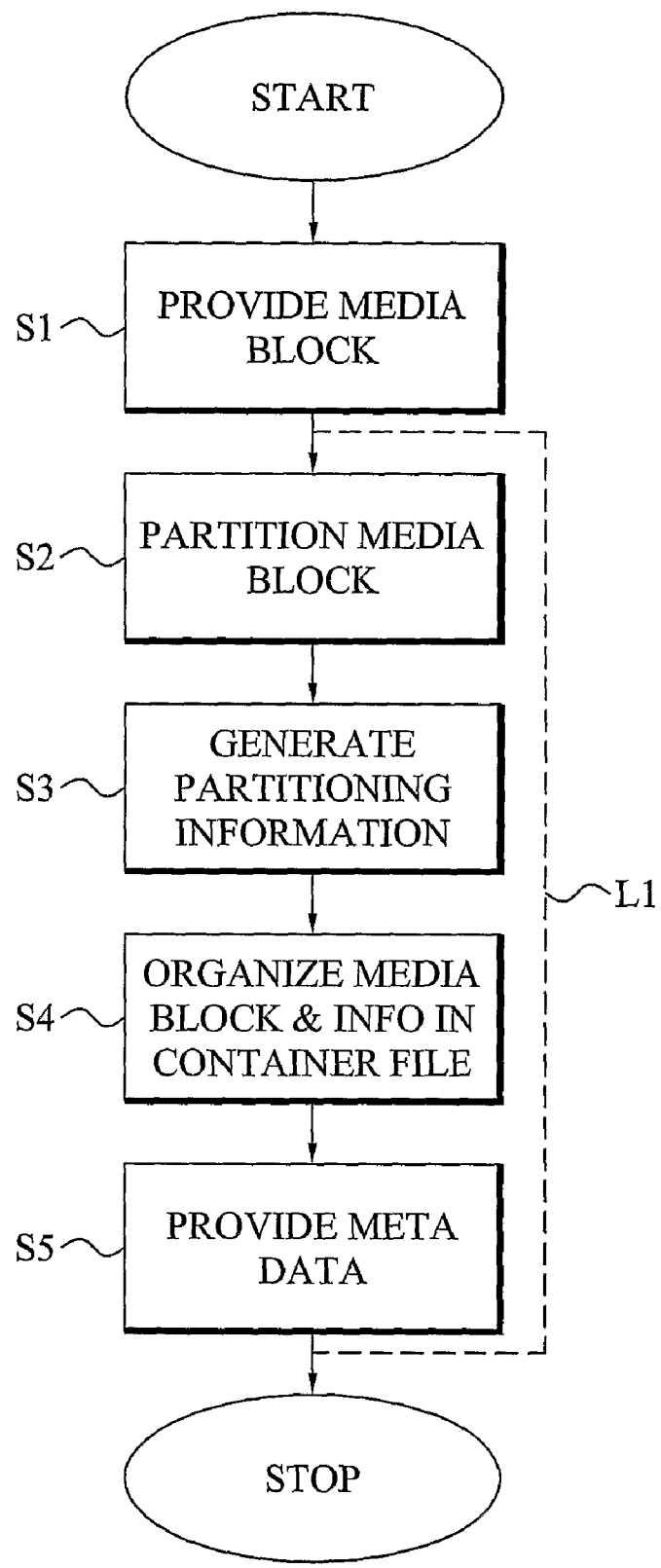
FIG. 1 is a flow diagram illustrating a method of generating a media container file according to an aspect of the present invention.

Throughout the drawings, the same reference characters will be used for corresponding or similar elements.

The present invention generally relates to media and multimedia data management and in particular to creation and utilization of container files in connection with media servers, such as streaming or downloading servers, in a radio-based communications network. These media container files of the invention comprises the media content to transmit to requesting client(s) and the instructions used for performing media processing and transmission in the media servers. According to the invention, the media content has been pre-processed and is present in a form that allows efficient management by a media server during a media session. In a particular aspect of the invention, the original media content has been pre-processed to simplify, at the media server, provision of reliability protection to the media session. Thus, the content is in a format allowing calculation of reliability protection data from the media content that can be used in the media session for increasing the chances of successful delivery to requesting clients.

According to a preferred embodiment of the invention, the pre-processing of the media content is performed and adapted for calculation, at the media server, forward error correction (FEC) redundancy data to be included in the transmitted media stream.

As is known in the art, FEC involves adding redundant data to transmitted payload data, which allows a receiver to detect and correct error without the need to ask the sender for additional data. The advantage of FEC is that retransmission of data can often be avoided, though at the cost of higher bandwidth requirements on average. Thus, FEC can advantageously be used in connection with multicast/broadcast-based delivery of media content, where retransmissions will be hard to implement.

FEC is accomplished by adding redundancy to the information to be transmitted using a selected algorithm or scheme, typically denoted FEC codec in the art. Each such redundant bit is invariably a complex function of many original information or payload bits. A FEC codec that include the unmodified input in the output is denoted a systematic codec. In other words an (N, K) systematic FEC codec preserves the K source or payload symbols and appends (N-K) FEC symbols. Correspondingly, an (N, K) non-systematic FEC codec creates N (FEC or source) symbols from K source symbols without necessarily preserving all of them.

There are two main categories of FEC codecs: block codes and convolutional codes. FEC block codecs work on fixed-size blocks (packets) of bits or symbols of predetermined size, whereas convolutional codecs work on bit or symbol streams of arbitrary length. Digital Fountains Raptor code is FEC block codec that is capable of creating an arbitrary number of FEC redundancy symbols out of a single source block. This is an advantageous property of this FEC codec since this means that different protection-overhead configurations do not require a change in the source block construction. Reed-Solomon is another FEC block codec that, however, requires a change in the source block partitioning for different protection overhead sizes. Other examples of FEC block codecs include Golay, BCH (Bose, Ray-Chaudhuri, Hocquenghem) and Hamming. A preferred FEC code to use in connection with the present invention is the Digital Raptor codec.

According to the current invention, media or multimedia data or content refers to any data that can be provided by a content provider or server to a client for rendering of the data. Typical preferred examples include video data and audio data. The data can be in the form of a pre-encoded, fixed rate audio or video content version or in the form of a scalable audio or video content. Other media examples include still images (JPEG), bit map graphics (GIF and PNG), vector graphics (SVG), and synthetic audio (SP-MIDI) and text (XHTML and SMIL).

FIG. 1 is a flow diagram of a method of generating a media container file according to the present invention. This media container file can be regarded as a complete input package that is used by a media server during a media session for providing media content and forming media data into transmittable data packets. Thus, the container file preferably comprises, in addition to the media content per se, information and instructions required by the media server for performing the processing and allowing transmission of the media content during a media session.

The method starts in step S1 where at least one media source block is provided. The at least one media source block comprises the media data or symbols that are intended to be sent to a client, where they are rendered for presenting media content to a user. The media blocks may be of a fixed, same size or at least a portion thereof, if more than one, may be of different bit/symbol sizes. If more than two media source blocks are provided in step S1, they may be regarded as separate media blocks of a same media content file or stream, e.g. a video stream, and/or of different media files or streams, e.g. a few media source blocks of an video stream and a few media blocks of a corresponding associated audio stream.

In this step S1, associated media content can be provided. For example, if the media content includes a music video, at least one provided media block preferably comprise the video data and at least one media block contains the corresponding audio data. However it is anticipated by the present invention that one and the same media content may provided in multiple potential media versions. For example, the video part of the music video can be provided in multiple pre-encoded video versions, where each such video version is adapted for usage in connection with a given bandwidth or bit rate level or interval. Multiple versions of a given media content may therefore be provided in step S1. In such a case, each such media version can be regarded as consisting of one or more media source blocks. Though multiple media versions may be provided and organized into the container file, typically only one such version is used at a given time during the media session, though there may be a switch between the media versions during the session based on, for example, changes in available bandwidth levels.

In a next step S2, the provided media source block is partitioned into source symbols or so-called chunks. These symbols generally consist of a number of hundred bytes. This block partitioning is performed at least partly based on information of the FEC codec/algorithm to be used, by a media server, for calculating FEC symbols for the current media source block. As was mentioned in the foregoing, Reed-Solomon based FEC codes requires a change in the source block partitioning based on the desired protection overhead size, i.e. the number of FEC redundancy symbol. Thus, the actual FEC codec or algorithm and/or required FEC protection overhead could affect the media source partitioning and the media symbol sizes. Also other parameters such as the size of data packets, such as User Datagram Protocol (UDP) packets, used by a media server for transmitting the media content can be used in this source block partitioning of step S2. In such a case, the size of the source symbols could be limited so at least one complete source symbol can be fit into a UDP packet.

This partitioning step S2 does not necessarily imply that the media source block is physically divided into separate source symbols that are stored at separate locations in the container file. In clear contrast, in most practical implementations, the media source file is stored as one continuous data sequence in the container file but is regarded as or virtually divided into media source blocks, in turn virtually partitioned into source symbols.

In a next step S3, information of the partitioning is generated. This information basically specifies which portions of the data sequence that belongs to which source symbol of the media source block. The partitioning information may be organized into a table specifying that bit X to bit Y of media source block Z constitute a source symbol. Alternatively, the information can include the size in bytes of each source symbol. Then, knowing the start location of a media source block in a media file, it is possible to determine which data portions that belong to the different source symbols.

It is anticipated by the present invention that a given media source block can be partitioned according to at least two different partitioning operations. For example, a first such block partitioning could be adapted for a first FEC algorithm, whereas a second partitioning is employed adapted for a second FEC algorithm. Furthermore, the block partitioning can also be dependent on the actual desired FEC overhead at the media server. In such a case, different block partitionings designed to different FEC overheads could be determined at the file creation. The partitioning information then comprises information of these alternative partitionings applicable to a given media source block.

The partitioned media block and the generated partitioning information are organized into the media container file in step S4. Thus, the media content and the information are inserted as portions of the container file. Furthermore, the at least one media block organized in the container file preferably collectively comprise all media content data that is to be transmitted to a client during a media session. In other words, the container file contains the media data for an entire multimedia presentation.

A next step S5 provides meta data to be included in the container file. This meta data provides an association between the media source block added to the container file in step S4 and the partitioning stored in the file in step S4. This association can be in the form of a pointer from the storage location of the media source block within the file and to the storage location of the partitioning information, or vice versa. This meta data therefore enables, given the particular media source block or its location within the container file, identification of the associated partitioning information or the storage location of this information within the file. Instead of employing a pointer, the meta data can include an identifier of the media source block and/or the associated information, in the case these are stored on pre-defined, "standard" or "default" locations in the container file. The meta data is then used to identify one of the media source block and the partitioning in the file and based on this identified location the other of the media source block an the information can be identified.

In a typical implementation of the invention, multiple media source blocks are provided in step S1. In such a case, the steps S2 to S5 are preferably repeated for each such media source block or at least for multiple groups of media source blocks, which is schematically illustrated by the line L1. Thus, if N media source blocks are organized into the container file in step S1, the steps S2 to S5 are preferably repeated N times, implying also organizing N partitioning information and meta data versions in the container file besides the source blocks.

The method then ends.

As was mentioned in the foregoing, an objective of the present invention is to provide a media container file that, in addition to the actual media data, also comprises FEC-dependent partitioning information to be used when calculating FEC data. This means that the file-to-source-block division and block partitioning are done "off-line" and independent from the actual media transmission process in a media server. This pre-processing simplifies the tasks of the server and reduces the performance requirements and complexity of the server. In addition, the container file preferably also comprises information and instructions required by a media server for identifying and composing media data and calculated FEC data into a media stream that can be transmitted to requesting clients. Thus, the container file can therefore be regarded as a complete package of data, information and instruction that can be used by transparent and flexible servers for data compilation and transmission.

The container file generation described above in connection with FIG. 1 is preferably conducted at a content creator or server having access to internal or external media content sources. The generated container file may then be represented in a storage medium such as a computer memory, or in a physical signal such as an electrical signal or a radio signal, e.g. for transfer within a local system or for transmission over a local or global network. In a typical embodiment, the container file is provided as a radio signal to a media server for usage in a media session with different clients.

In the following, the term media container file will be used throughout the disclosure with a meaning including both data files for storage in a storage medium and signals for transfer or distribution.

Figure 2:
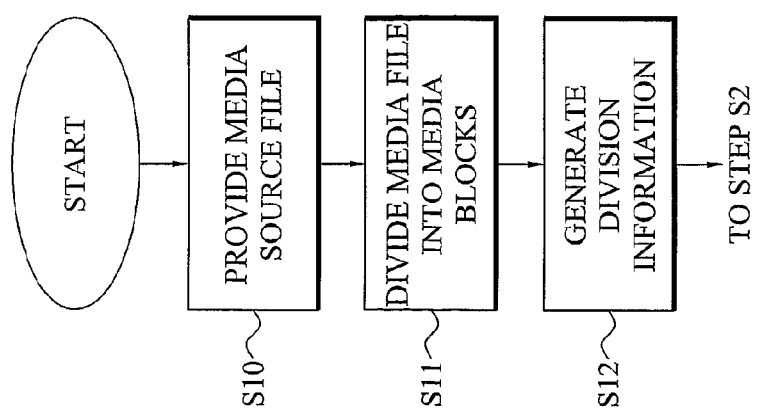
FIG. 2 is a flow diagram illustrating the media block providing step of FIG. 1 in more detail.

FIG. 2 is a flow diagram illustrating additional steps of the container file generating method of FIG. 1. The method starts in step S10 where at least one media source file is provided. In this illustrative embodiment, media content is available at the container file creator in the form of source files or streams containing the media data. In this step S10, one or more media source files can be provided for inclusion into a container file. For example, a first media file can contain video data, whereas a second associated file contains audio data. In order to enable efficient calculation of FEC redundancy data at the media server and, subsequently, usage of such FEC data, the media source file(s) provided in step S10 is divided into a number of media blocks in a next step S11. This media source block can then be regarded as a segment of the media source file, to which a FEC code can be applied or operate. The size of the media blocks in terms of source symbols or data bits can be pre-defined or selected in connection with the division. In the former case, the size could be defined by the intended FEC scheme or code to be employed for calculation of FEC redundancy data. Thus, the actual FEC codec or algorithm and/or required FEC protection overhead could affect the media file division and the media block sizes.

In the case the input media source file has a bit or symbol size that is smaller than the maximum size that can be effectively handled by a FEC codec, no division of that source file into media source blocks is of cause required and step S11 can be omitted. The input media source file is then regarded as a media source block according to the invention.

It is to be noted that even though there is a preferred block size, not all media source blocks generated from a media source file need to be of that preferred size. For example, the last media source block might be of a smaller size as compared to the other equisized blocks since the remaining portion of the media file does not contain enough media data to reach the preferred block size.

This dividing step S11 does not necessarily imply that the media source file is physically divided into separate media source blocks that are stored at separate locations in the container file. In clear contrast, in most practical implementations, the media source file is stored as one continuous data sequence in the container file but is regarded as or virtually divided into media source blocks. For example, a media source file containing 2N source symbols can be divided so that source symbol [0, N−1] belongs to the first source block and symbol [N, 2N−1] belong to the second source block.

In a next step S12, information of the particular media source file division is provided. This information can be of relevance for the media server, when they are to provide media data packet streams and/or calculating FEC data.

The method then continues to step S2 of FIG. 1, where the media source block(s) is (are) partitioned into media source blocks.

Figure 3:
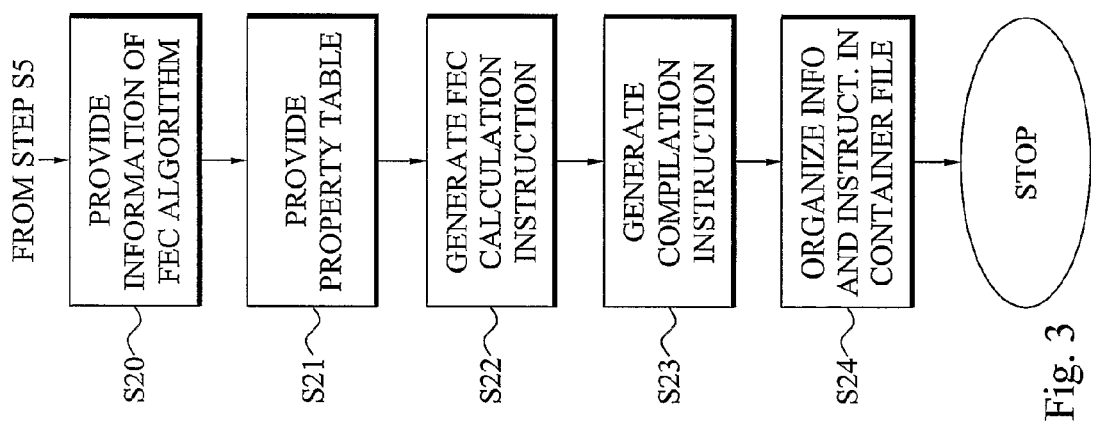
FIG. 3 is a flow diagram illustrating additional steps of the file generating method of FIG. 1.

FIG. 3 is a flow diagram illustrating additional steps of the container file generating method of FIG. 1. The method continues from step S5 of FIG. 1. In a next step S20, information of the FEC algorithm of scheme, based on which the block partitioning was calculated, is provided. This information can be in the form of the name of the particular algorithm or some other descriptive information. In an alternative approach, each available FEC algorithm has a pre-defined identifier. Thus, only this FEC identifier may then be provided in step S20. In a typical implementation, information of a single FEC codec has been employed for partitioning all media source blocks of a media source file. However, it might actually be possible to use different FEC codec information when partitioning for different media source blocks of a given media source file or for media source blocks of different source files. The FEC information could therefore specify that all blocks in the container file have been partitioned to allow calculation of FEC symbols with a single FEC codec or identify which source block or group of source blocks for which different FEC codecs have been used. In this context, it is actually possible to partition a given source block based on different potential target FEC codecs and/or FEC overheads. In such a case, information of these different FEC codecs is preferably provided in step S20.

In a next step S21, a property table is preferably provided. This property table is in particular useful if more than one media source file/stream is included in the container file but can advantageously be used also when only containing a single media source file. The file property table typically contains information of the media type of the media source files, preferably the Multipurpose Internet Mail Extensions (MIME) type of the media. Thus, this MIME information could specify that the media is audio media, video media or some other media type, including Synchronized Multimedia Integration Language (SMIL). This MIME type provides information to the media server of what type of data that is actually included in the container file. The property table can also include information of any coding scheme employed to the media data, including gzip. Also size information can be included in the property table. This size information could state the total size of each media source file in terms of number of bytes or symbols, the respective sizes of the media source blocks of the source file(s) (basically corresponding to the division information provided in step S12 of FIG. 2), maximum or target payload size for data packets to be used when transmitting data, the size (in bytes) of a media source symbol (basically corresponding to the partitioning information generated in step S3 of FIG. 1) and/or FEC symbol, etc.

A file name or file identifier is preferably included in the property table for each media source file included in the container file.

Information of the actual storage location of each media source file in the container file is preferably found in the property table. This location information could specify the start position of the first media source block of that source file and then the remaining media blocks are found in subsequent to this position in the container file. The meta data generated in step S5 of FIG. 1 and that provides an associated between media source blocks and partitioning information in the container file can also be included in the property table. Correspondingly, the information of the employed block partitioning and the FEC codec intended for redundancy data calculation is preferably included in the table.

The property table of the container file could therefore be used as a single information source for a media source to locate a relevant media source file/block and other information useful in compilation of media packets during a media session.

FEC calculation instructions are generated in a next step S22. These instructions are used by a media server for calculating FEC data for the media source blocks based on the meta data and the partitioning data of those source blocks. Thus, these instructions could be regarded as hints or meta data that provides instructions of how media source symbols of different source blocks are input to a FEC codec, preferably defined based on the FEC information, to generate FEC symbols to be used together with the media content in a media session to provide reliability protection. The instructions are preferably used together with the partitioning information and the meta data (allowing identification of the partitioning information) for calculating a reservoir of FEC symbols for at least one of the media source blocks.

In a preferred implementation, the FEC calculation instruction defines calculation of a set of FEC redundancy symbols for the at least one media source block. This FEC symbol set could include one but preferably multiple FEC symbols calculated based on the source symbols of the media source block.

The FEC calculation instructions could include multiple alternative instructions for a given media source block. For example, a first alternative FEC instruction is employed when a first FEC codec is to be used for the FEC data calculation as determined based on the FEC algorithm information. Correspondingly, a second alternative FEC instruction defines calculation of FEC data with a second FEC codec. Alternatively, or in addition, the alternative FEC instructions could adapted to different FEC overheads and thereby basically specify calculation of different number of FEC symbol depending on the allowable maximum (or minimum) FEC overhead.

A next step S23 generates compilation instructions for usage by a media server. These instructions are used for defining compilation of media data from the media source blocks and FEC redundancy data calculated based on the FEC calculation instruction(s) to form a media stream of data packets. Thus, these instructions could be regarded as hints or meta data that provides instructions of how use the data included in the container file and calculated therefrom for composing a transmittable media packet stream having reliability protection. These instructions are therefore used to compile media data and FEC data together into suitable packets for transmission to requesting clients during a media session. The instructions will therefore describe the server-side transmission order of media source data and FEC data. Note though that instructions typically do not include time scheduling information, information of target/source addresses or ports or other session-specific information. This means that the container file and the compilation instructions therein is transparent to the particular session and can actually be used by a media server for multiple different sessions with different receiving clients but also by different media servers.

The compilation instructions could apply to a subset of the media source blocks, implying that multiple such instructions have to be read and used by a media server during a session. Alternatively, a compilation instruction comprises all information required for a single media source file or indeed for all media source files in the container file.

More than one set of compilation instructions may actually be generated in step S23. In such a case, different alternative instructions could be provided, so that a media server has a choice of determining which particular instruction set to employ for a particular media session. For example, a first compilation instruction could be used for describing the transmission order of media source blocks and FEC data when employing a single transmission channel for the data transmission. A second instruction could be applied to the same media source blocks and FEC data but provides compilation and transmission order information if multiple channels are available, implying that data can be transmitted in parallel instead of sequentially. Thus, the several compilation instructions can be used to provide alternative transmission sessions intended for different transport channel conditions.

In a similar manner, alternative compilation instructions can be included for different reliability protection overheads. For example, a first compilation instruction is used for describing the compilation and transmission order of media source blocks and FEC data for a first maximum protection overhead level, whereas a second instruction is used for the same media source blocks but with a second different FEC overhead level. If this second FEC overhead level is higher (lower) than the first level, more FEC symbols or parity symbols as they are also denoted in the art can be added to a given amount of media source symbols.

A next step S24 organizes the information, table and instructions provided and generated in the previous steps S20 to S23 and preferably step S12 of FIG. 2 in the container file. The container file will then contain the complete set of "raw" media data, information, instructions and meta data required by a media server for identifying, calculating and composing data for transmission to requesting client(s). The method then ends.

Figure 4:
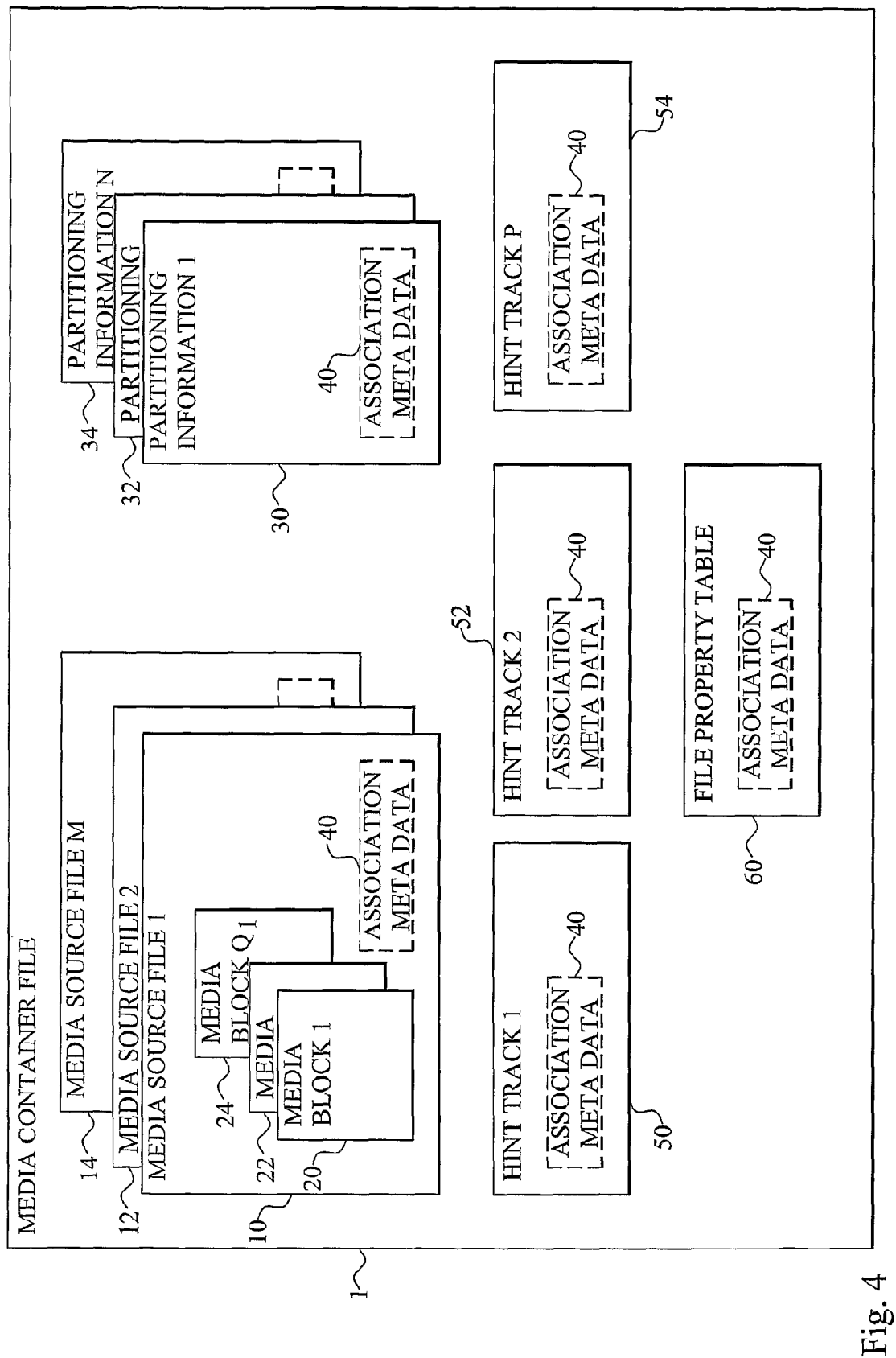
FIG. 4 is a schematic overview of a media container file according to another aspect of the present invention.

FIG. 4 is a schematic overview of a media container file 1 according to the present invention. As has been described in the foregoing, the container file 1 contains media data of a number of media source files 10, 12, 14, M such files are illustrated in the figure, where $M \geq 1$. The media data of each file 10, 12, 14 is regarded as divided into a number of media source blocks 20, 22, 24. In the figure $Q_1$ such blocks 20, 22, 24 have been illustrated for the first media source file 10, where $Q_1 \geq 1$. Each such media source block 20, 22, 24 is in turn regarded as being partitioned into source symbols.

In addition to the media source blocks 20, 22, 24 with media data, the container file 1 comprises portioning information sets 30, 32, 34 containing pre-generated information of the source symbol partitionings that has been applied to the media source blocks 20, 22, 24 for the purpose of facilitating calculation of FEC redundancy data to be used in connection with the media data for providing reliability protection. In a preferred implementation, each media source block comprises a dedicated partitioning information set 30, 32, 34. In such a case, the number N of information sets 30, 32, 34 in the figure is $$N = \sum_{i=1}^{M} Q_i.$$

The association meta data 40 of the invention that provides an association between the partitioning information 30, 32, 34 and the media source block(s) 20, 22, 24 to which the partitioning information 30, 32, 34 is applicable is also provided in the container file 1. FIG. 4 illustrates multiple different possible locations of this meta data 40 in the file 1. In a first embodiment, the meta data is stored in connection with the associated media source block(s) 20, 22, 24. Thus, identification of a media source block 20, 22, 24 in the file also enables identification of the respective meta data 40 of that source block 20, 22, 24. Alternatively, or in addition, the meta data 40 is stored together with the respective partitioning information 30, 32, 34. Thus, each information set 30, 32, 34 has a connected association meta data 40 that allows identification of the relevant media source block(s) 20, 22, 24 for which the particular partitioning information 30, 32, 34 applies. If the container file 1 comprises a preferred file property table 60, the association meta data 40 could be provided therein. In such a case, a media server might only investigate the file property table 60 to identify the location of the relevant media data and partitioning data to use during a media session. In a further possible implementation, the association meta data 40 is stored in connection with the different hint tracks 50, 52, 54 of the container file 1. These hint tracks comprises FEC calculation and/or compilation instructions to use by a media server in connection with a media session. In such a case, each hint track 50, 52, 54 need only contain the meta data 40 that is required for the media session implementable by the instructions in that hint track 50, 52, 54. A combination of multiple of these possible storage locations are also possible and within the scope of the present invention.

According to a specific embodiment of the present invention, the media container file 1 is an interleaved unit, which is optimized for progressive download or streaming. Thereby, an entire multimedia presentation can be transmitted and downloaded by so-called progressive download or streaming to requesting clients.

The ISO base media file format [1, 2, 3] can advantageously be employed as file format for the media container file of the present invention. Alternative container file formats include, the MP4 file format, 3GP file format and QuickTime format.

Asynchronous Layered Coding (ALC) is a massively scalable reliable content delivery protocol. It is a base protocol for reliable multicast delivery of arbitrary binary objects and has been adopted as the mandatory protocol for broadcast/multicast file delivery in 3GPP2 BCMCS (Broadcast/Multicast Service) and Open Mobile Alliance (OMA) Browser and Content (BAC) Broadcast (BCAST) working group.

FLUTE (File Delivery over Unidirectional Transport) builds on top of ALC and defines a protocol for unidirectional delivery of files and has recently been adopted in 3GPP MBMS and DVB-H IP Data Casting (IPDC) as the mandatory protocol for broadcast/multicast file delivery. Both ALC and FLUTE are defined by the Internet Engineering Task Force (IETF).

FLUTE defines a File Delivery Table (FDT), which carries meta data associated with the files delivered in the ALC session, and provides mechanisms for in-band delivery and updates of FDT. In contrast, ALC relies on other means for out-of-band delivery of file metadata. OMA BCAST defines an Electronic Service Guide (ESG) that is normally delivered to clients well in advance of the ALC session. If the file metadata needs to be updated during the ALC session, then fragments of ESG can be updated by using the ESG delivery/update channels.

Files to be delivered over ALC or FLUTE can be stored as items in an ISO container file. The Meta box and its child boxes enable storing of a variety of data items, such as static media (pictures) and SMIL presentations, into an ISO base media file. They also allow associating file names and paths to items and signaling of the file directory structure in the ISO base media file.

Generally, the first step before files can be sent over ALC/FLUTE is to partition them into source blocks and source symbols according to the present invention. The partitioning may depend on the FEC scheme, the target packet size, and the desired FEC overhead. For each source block of a FEC encoding, partitioning information are pre-computed and stored in the ISO base media file together with information on the FEC scheme and file division information.

The next step to facilitate transmission of files is to let the ISO base media file also contain instructions defining calculation of FEC symbols from the media source blocks using the partitioning information. Furthermore, the ISO base media file preferably also comprise instructions for a multicast/broadcast server that describe the ALC/FLUTE sessions (with Session Description Protocol) and how to encapsulate items into ALC or FLUTE packets.

The file partitioning, on the one hand, and the hint tracks for delivery of files, on the other, can be used independently of each other. The former aids the design of hint tracks and allows alternative hint tracks, with, e.g., different FEC overheads, to re-use the same FEC symbols. They also provide means to access source symbols. In order to reduce complexity when a server follows hint track instructions, however, hint tracks refer directly to data ranges of items or data copied into hint samples.

In the following a more detail implementation example of a container file according to the invention in the form in the ISO base media file format and adapted for transmission over ALC/FLUTE is given. This should, however, merely be seen as an illustrative example of the present invention and obvious modifications and changes to this example are within the scope of the invention.

Storage of Source Files

Files intended for transmission over ALC/FLUTE are stored as items in a top-level Meta box ('meta') of an ISO base media file acting as a container file. The Item Location box ('iloc') specifies the actual storage location of each item (media source file) within the container file as well as the file size of each item. The file name, content type (MIME type), etc., of each item are provided by the Item Information box ('iinf').

FD Item Information Box

Details on the partitioning of source files are provided in the FD Item Information box ('fiin'). The box is preferably used for files employing FD hint tracks and preferably exactly one is located in the Meta box ('meta'). It is defined as follows:

```
aligned(8) class FDItemInformationBox extends FullBox('fiin',
   version = 0, 0)
{
    unsigned int(16) entry_count;
    PartitionEntry[ entry_count ] partition_entries;
```

```
    SessionGroupBox session_info;
    GroupIdToNameBox group_id_to_name;
}
```

Each PartitionEntry in the FD Item information box provides details on a particular file partitioning and meta data for a particular media source file. It is possible to provide multiple entries for one source file if alternative partitionings are used in the ISO file. All partition entries can be implicitly numbered and the first entry typically has number 1.

Partition Entry

The Partition Entry ('paen') of a source is defined as follows:

```
aligned(8) class PartitionEntry extends Box('paen')
{
    FilePartitionBox blocks_and_symbols;
}
```

It can contain one box that defines the media source partitioning.

File Partition Box

The File Partition box ('fpar') identifies the source file and provides a partitioning of that file into source blocks and symbols. Definition:

```
aligned(8) class FilePartitionBox extends FullBox('fpar', version = 0, 0)
{
    unsigned int(16) item_ID;
    unsigned int(16) packet_payload_size;
    unsigned int(16) FEC_encoding_ID;
    unsigned int(16) FEC_instance_ID;
    unsigned int(16) max_source_block_length;
    unsigned int(16) encoding_symbol_length;
    unsigned int(16) max_number_of_encoding_symbols;
    string scheme_specific_info;
    unsigned int(16) entry_count;
    for (i=1; i <= entry_count; i++)
    {
        unsigned int(16) block_count;
        unsigned int(32) block_size;
    }
}
```

Semantics:

item_ID indicates the item_ID of the source file. It is possible to provide alternative partitionings of a source file by using the same item_ID in the File Partition box of more than one File Information entry.

packet_payload_size gives the target FLUTE or ALC packet payload size of the partitioning algorithm. Note that UDP packet payloads are larger, as they also contain FLUTE or ALC headers.

FEC_encoding_ID identifies the FEC encoding scheme. A zero value could correspond to a default scheme, such as to the "Compact No-Code FEC scheme" also known as "Null-FEC" [4]. A value of one preferably corresponds to the "MBMS FEC" [5].

FEC_instance_ID provides a more specific identification of the FEC encoder being used for an Under-Specified FEC scheme. This value is typically not used for Fully-Specified FEC schemes. See the document [4] for further details of Under-Specified FEC schemes.

max_source_block_length gives the maximum number of source symbols per media source block.

encoding_symbol_length gives the size (in bytes) of one encoding symbol (source symbol and FEC parity symbol). All encoding symbols of one item preferably have the same length, except the last symbol which may be shorter.

max_number_of_encoding_symbols gives the maximum number of encoding symbols that can be generated for a source block for FEC encoding ID 129 defined in the document [4].

scheme_specific_info is a base64-encoded null-terminated string of the scheme-specific object transfer information (FEC-OTI scheme specific info) in "FLUTEbis". The definition of the information depends on the FEC encoding ID.

entry_count gives the number of entries in the list of (block_count, block_size) pairs that provides a partitioning of the source file. Starting from the beginning of the file, each entry indicates how the next segment of the file is divided into source blocks and source symbols.

block_count indicates the number of consecutive source blocks of size block_size (in bytes). A block_size that is not a multiple of the symbol size (provided in the FEC Information Box) indicates that the last source symbol includes padding not stored in the file item.

Item Info Box

In order to transmit internally embedded discrete media using broadcast/multicast file download protocol (ALC/FLUTE), it is preferred for the server to also transmit some meta data corresponding to the discrete media. The meta data is sent as part of the FDT, if FLUTE is used as a broadcast protocol, and as part of OMA BCAST ESG, if ALC is used in conjunction with OMA BCAST ESG.

As some of the Meta data information might be created on the fly, a template structure for the part of the meta data that is static and common to both FLUTE and ALC is defined as a second version of the item information entry. This version of the item information entry is used in the Item information box for items that have a source file partitioning.

```
aligned(8) class ItemInfoEntry extends FullBox('infe', version = 1, 0)
{
    unsigned int(16) item_ID;
    unsigned int(16) item_protection_index;
    unsigned int(32) content_length;
    unsigned int(32) transfer_length;
    string item_name;
    string content_type;
    string content_location;
    string content_encoding;
    string content_MD5;
    unsigned int(8) entry_count;
    for (i=1; i <= entry_count; i++)
    {
        unsigned int(32) group_id;
    }
}
```

Semantics:

item_id contains either 0 for the primary resource (e.g. the Extensible Markup Language (XML) contained in an 'xml' box) or the ID of the item for which the following information is defined.

item_protection_index contains either 0 for an unprotected item, or the one-based index into the item protection box defining the protection applied to this item (the first box in the item protection box has the index 1).

content_length gives the total length (in bytes) of the (un-encoded) file.

transfer_length gives the total length (in bytes) of the (encoded) file. Note that transfer length is equal to content length if no content encoding is applied (see below).

item_name is a null-terminated string in UTF-8 characters containing a symbolic name of the item, i.e. the filename of the item (source file);

content_type is a null-terminated string in UTF-8 characters with the MIME type of the item. If the item is content encoded (see below), then the MIME type refers to the item after content decoding.

content_location is a null-terminated string in UTF-8 characters containing the URI of the file as defined in HTTP/1.1 [6].

content_encoding is a null-terminated string in UTF-8 characters used to indicate that the binary file is encoded and needs to be decoded before interpreted. The values are as defined for Content-Encoding for HTTP/1.1. Some possible values are "gzip", "compress" and "deflate". An empty string indicates no content encoding. Note that the item is stored after the content encoding has been applied.

content_MD5 is a null-terminated string in UTF-8 characters containing an MD5 digest of the file [6, 7].

entry_count gives the number of entries in the following list.

group_ID indicates a file group to which the file item belongs.

All fields are preferably employed. However, it is possible that a null-terminated string only contains a null to indicate that the corresponding value of the field is not provided. Future extensions to the box may add additional fields at the end.

By considering the information provided in the File Information box for each item and the list of items used by a hint track, file entries needed for an FDT or an ESG can be constructed.

The content_location of embedded media resources may be referred by using the Universal Resource Location (URL) forms defined in Section 8.44.7 of the ISO base media file format [1, 2].

Session Group Box

An FD session can send simultaneously over several FD channels, each of which is described by an FD hint track. The Session group box contains a list of sessions as well as all media file groups and hint tracks that belong to each session. If there is more than one FD hint track in the container file, then one session group box is preferably present in the FD Item Information box.

Only one session group should be processed at any time. The first listed hint track in a session group specifies the base channel. If the media server has no preference between the session groups, the default choice is typically the first session group. The group IDs of all file groups containing the files referenced by the hint tracks is included in the list of file groups. The file group IDs can in turn be translated into file group names (using the Group ID To Name box) that can be included by the server in FDTs.

```
aligned(8) class SessionGroupBox extends Box('segr')
{
    unsigned int(16) num_session_groups;
    for(i=0; i < num_session_groups; i++)
    {
        unsigned int(8) entry_count;
        for (j=0; j < entry_count; j++)
        {
            unsigned int(32) group_ID;
```

```
            }
        unsigned int(16) num_channels_in_session_group;
        for(k=0; k < num_channels_in_session_group; k++)
        {
            unsigned int(32) hint_track_id;
        }
    }
}
```

Semantics:

num_session_groups specifies the number of session groups.

entry_count gives the number of entries in the following list comprising all file groups that the session group complies with. The session group contains all files included in the listed file groups as specified by the item information entry of each source file. The FDT for the session group should preferably only contain those groups that are listed in this structure.

group_ID indicates a file group that the session group complies with.

num_channels_in_session_groups specifies the number of channels in the session group. The value of num_channels_in_session_groups is a positive integer.

hint_track_ID specifies the track ID of the FD hint track belonging to a particular session group. One FD hint track corresponds to one Layered Coding Transport (LCT) channel.

Group ID to Name Box

The Group ID To Name box associates file group names to file group IDs used in the item information entries.

```
aligned(8) class GroupIdToNameBox extends FullBox('gitn',
version = 0, 0)
{
    unsigned int(32) entry_count;
    for (i=1; i<=entry_count; i++)
    {
        unsigned int(32) group_ID;
        string group_name;
    }
}
```

Semantics:

entry_count gives the number of entries in the following list.

group_ID indicates a file group.

group_name is a null-terminated string in UTF-8 characters containing the corresponding file group name.

Hint Track Format

The hint track structure is generalized to support hint samples in multiple data formats. The hint track sample contains any data needed to build the packet header of the correct type, and also contains a pointer to the media source block of data that belongs in the packet.

Sample Entry Format

FD hint tracks are hint tracks (media handler 'hint') with an entry-format in the sample description of 'fdp', short for File Delivery Protocol. The FDHintSampleEntry is contained in the SampleDescriptionBox ('stsd') and has the following syntax:

```
class FDHintSampleEntry( ) extends SampleEntry ('fdp ')
{
    uint(16) hinttrackversion = 1;
    uint(16) highestcompatibleversion = 1;
    uint(16) partition_entry_ID;
    uint(16) FEC_overhead;
    box additionaldata[ ];
}
```

Semantics:

partition_entry_ID indicates the partition entry in the FD item information box. A zero value indicates that no partition entry is associated with this sample entry, e.g. for FDT.

FEC_overhead is a fixed 8.8 value indicating the percentage protection overhead used by the hint sample(s). The intention of providing FEC_overhead is to provide characteristics to help a media server select a session group (and corresponding FD hint tracks).

The fields, "hinttrackversion" and "highestcompatibleversion" have the same interpretation as in the "RtpHintSampleEntry", described in section 10.2 of the ISO base media file format [1, 2]. As additional data a time_scale_entry box may be provided. If not provided, there is no indication given on timing of packets.

File entries needed for an FDT or an ESG can be created by observing all sample entries of a hint track and the corresponding File Metadata Information boxes of the items referenced by the above item_IDs. No sample entries shall be included in the hint track if they are not referenced by any sample.

Sample Format

Each FD sample in the hint track will generate one or more FD packets. Each sample contains two areas: the instructions to compose the packets, and any extra data needed when sending those packets (e.g. encoding symbols that are copied into the sample instead of residing in items for source files or FEC). Note that the size of the sample is known from the sample size table.

```
aligned(8) class FDsample extends Box('fdsa')
{
    FDPacketBox packetbox[ ]
    ExtraDataBox extradata;
}
```

Sample numbers of FD samples define the order they shall be processed by the media server. Likewise, FD Packet boxes in each FD sample appear in the order they shall be processed. If the Time Scale Entry box is present in the FD Hint Sample Entry, sample times are defined and provide relative send times of packets for a default bit rate. Depending on the actual transmission bit rate, a server may apply linear time scaling. Sample times may simplify the scheduling process, but it is up to the media server to send packets in a timely manner.

Packet Entry Format

Each packet in the FD sample has the following structure [8-10]:

```
aligned(8) class FDpacketBox extends Box('fdpa')
{
    header_template LCT_header_info;
    unsigned int(16) entrycount1;
    dataentry header_extension_constructors[entrycount1];
    unsigned int(16) entrycount2;
    dataentry packet_constructors[entrycount2];
}
```

LCT_header_info contains LCT header templates for the current FD packet.

entry_count1: count of following constructors.

header_extension_constructors: structures which are used to construct the LCT header extensions.

entry_count2: count of following constructors.

packet_constructors: structures which are used to construct the FEC payload ID and the source symbols in an FD packet.

LCT Header Template Format

```
class header_template
{
    unsigned int(1) sender_current_time_present;
    unsigned int(1) expected_residual_time_present;
    unsigned int(1) session_close_bit;
    unsigned int(1) object_close_bit;
    unsigned int(4) reserved;
    unsigned int(16) transport_object_identifier;
}
```

The LCT header template can be used by a media server to form an LCT header for a packet. Note that some parts of the header depend on the server policy and are not included in the template. Some field lengths also depend on the LCT header bits assigned by the server. The server may also need to change the value of the TOI.

LCT Header Extension Constructor Format

Note that a meida server can identify packets including FDT by observing whether EXT_FDT is present.

```
aligned(8) class LCTheaderextension
{
    unsigned int(8) header_extension_type;
    unsigned int(8) header_extension_length;
    unsigned int(8) header_extension_content[ ];
}
``` header_extension_length is expressed in multiples of 32 bit words. A zero value means that the header is generated by the server.

header_extension_content is the number of items equal to header_extension_length.

Packet Constructor Format

There are various forms of the constructor. Each constructor is 16 bytes in order to make iteration easier. The first byte is a union discriminator. This structure is based upon section 10.3.2 from the ISO base media file format [1, 2].

```
aligned(8) class FDconstructor(type)
{
    unsigned int(8)    constructor_type = type;
}
aligned(8) class FDnoopconstructor extends FDconstructor(0)
{
    unsigned int(8)    pad[15];
}
aligned(8) class FDimmediateconstructor extends FDconstructor(1)
{
    unsigned int(8) count;
    unsigned int(8) data[count];
    unsigned int(8) pad[14 – count];
}
aligned(8) class FDsampleconstructor extends FDconstructor(2)
{
    signed int(8) trackrefindex;
    unsigned int(16) length;
```

-continued

```
    unsigned int(32) samplenumber;
    unsigned int(32) sampleoffset;
    unsigned int(16) bytesperblock = 1;
    unsigned int(16) samplesperblock = 1;
}
aligned(8) class FDitemconstructor extends FDconstructor(3)
{
    unsigned int(16) item_ID;
    unsigned int(16) extent_index;
    unsigned int(64) data_offset;
    unsigned int(24) data_length;
}
aligned(8) class FDxmlboxconstructor extends FDconstructor(4)
{
    unsigned int(64) data_offset;
    unsigned int(32) data_length;
    unsigned int(24) reserved;
}
```

Extra Data Box

Each sample of a FD hint track may include extra data stored in an Extra Data box:

```
aligned(8) class ExtraDataBox extends Box('extr')
{
    bit(8) extradata[ ];
}
```

Figure 5:
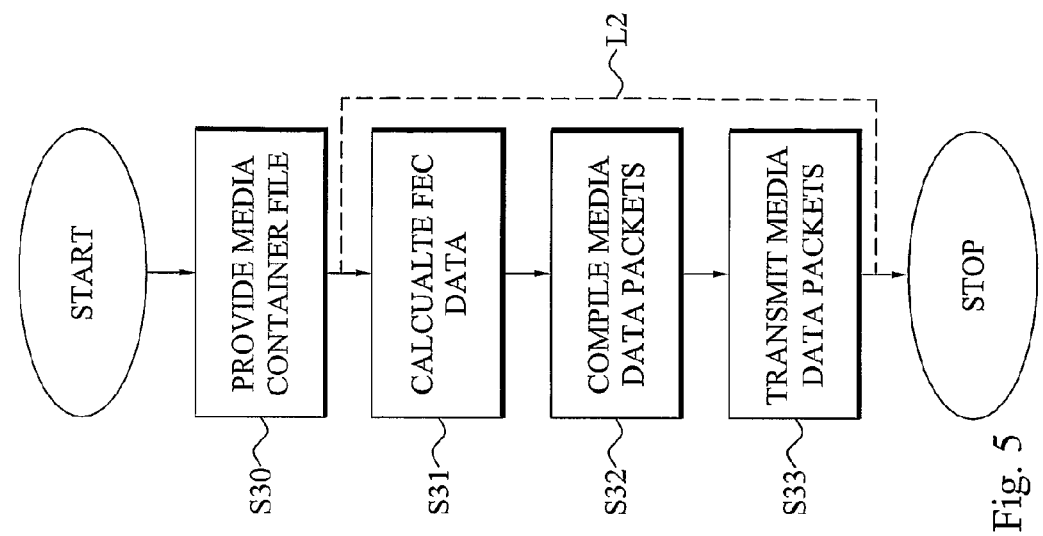
FIG. 5 is a flow diagram illustrating a media session managing method according to a further aspect of the present invention.

FIG. 5 is a flow diagram illustrating a media session managing method according to the present invention. This media session management is conducted in a media server, such as streaming or downloading server, and uses the media container file of the present invention. The method starts in step S30, where a media container file is provided. This file provision can be realized by fetching the container file from a memory location of the media server, implying that the server previously has received the file from a content provider or creator. Alternatively, the media server can, in connection with a request for media data, order or receive the container file from a content provider.

In a next step S41, FEC redundancy data is calculated using at least one media source block and based on the meta data and partitioning information associated with the at least one source block. In this calculation step S41, a FEC block codec, such as digital fountain raptor codec, is preferably employed that operate on media block basis. However, a convolutional FEC codec could also be employed and is within the scope of the present invention. In a preferred implementation, a set of FEC redundancy symbols are generated for the at least one media source block. This FEC symbol set could include one but preferably multiple FEC symbols calculated based on the source symbols of the media source block. The number of FEC symbols to calculate for a media source block could be defined by limitations in the FEC codec employed, be a function of the number of media source symbols in the media source block or limited by some other criteria, e.g. FEC overhead. Furthermore, information included in the media container file could specify the amount of FEC redundancy data to calculate.

In a preferred implementation, the media container file also comprises FEC calculation instruction used in this step S31. These instructions are then employed together with the partitioning information (and the meta information used for identifying the partitioning information) when selecting source symbols to be input to the FEC codec for generation of FEC symbols.

If the container file also comprises information of the division of the media source file(s) into media source blocks, this division information can be used for identifying correct source symbols to be used for FEC data calculation.

The number of FEC symbols calculated in step S31 could be determined by the media server based on some local criterion, such as maximum/minimum currently allowable FEC overhead during the media session. Alternatively, as mentioned above, information provided in the container file, such as the FEC calculation instructions, specifies the amount of FEC redundancy data to be calculated for a given media source block.

The calculation of FEC data in step S31 can be performed on-the-fly during the ongoing media session. Alternatively, the media server could generate a reservoir of FEC data before the actual session and then store the FEC reservoir in the container file or in a memory. The pre-calculated FEC data can then be used with the media content in the container file in a following media session.

In a next step S32, media data packets are compiled by extracting media data from media source block(s) of the container file and providing FEC redundancy data as calculated in step S31. The media server preferably receives an identifier of the media data to transmit during the media session. Alternatively, the container file might only contain media data of a single media data file so no selection of media source is necessary. In either case, the previously described information included in the container file, such as in the file property table, can be used for identifying the start of the media file, i.e. the first media source block from which transmission should be started. Furthermore, further information included in the container file could be used as instructions of how media data and FEC data should be combined and included in data packets adapted for wireless transmission over a radio-based channel or multiple channels to different clients.

In a next step S33, the compiled media data packets with the FEC reliability protection are transmitted, preferably through broadcast or multicast techniques, to clients, where the media data can be rendered. The packet transmission is typically initiated once a transmit buffer in the media server has reached a given level. However, during the media session, new data packets are compiled and entered in the transmit buffer, while other packets are being transmitted, which is schematically illustrated by the line L2.

The generated container file and the organization of media data and the provision of pre-calculated partitioning data therein, reduce the processing needs of the media server during a media session. This therefore leads to reduced server complexity and allows server flexibility as the server does not need to perform the source block construction and partitioning on the fly.

The method then ends.

FIG. 6 is a flow diagram illustrating an additional step of the media session managing method of FIG. 5. The method continues from step S30 of FIG. 5. In a next step S40, the media server selects a FEC algorithm or codec to employ for the FEC data calculation. This FEC algorithm is preferably the FEC algorithm used when partitioning a media source block, based on which FEC data is to be calculated. The media container file therefore preferably comprises information of this FEC algorithm/codec, which information is employed by the media server in the selecting step S40.

If the FEC information comprises identifiers of multiple available FEC algorithms and a given media source block is available in multiple different alternative partitionings, the media server preferably use other input information, including FEC overhead capacity and/or FEC calculation instructions, for selecting which FEC algorithm and which block partitioning information to use when calculating FEC data.

The method then continues to step S31 of FIG. 5, where the selected FEC algorithm is used for calculating the FEC data.

FIG. 7 is a flow diagram illustrating additional steps of the session managing method of FIG. 4. The method continues from step S31 of FIG. 5. In a next step S50 a FEC overhead capacity that can currently be employed for the transmission of data in the media session is determined. This capacity can be determined or at least estimated based on the bandwidth levels assignable to the server for the media transmission, minimum and maximum bit rate levels for the radio carrier(s) employed for this media transmission, etc. Actually any technique for determining such overhead capacity in connection with data transmission known in the art can be employed in this step S50.

Once the FEC overhead capacity has been determined, a next step S51 selects a compiling instruction set based on the determined overhead capacity. Thus, the media container file then contains multiple alternative sets of compiling instructions that can be used for a given media content but provides different levels of FEC overhead. In other words, these alternative compiling instructions basically define the amount of FEC redundancy data to add to the media data when compiling media data packets. The larger the acceptable FEC overhead, the more FEC data is added. By having different alternative compiling instructions, the media server can use those instructions that allow a highest allowable FEC protection given the current overhead limitations and thereby increases the chances of successful reception and decoding of the media data at different clients as compared to usage of a single compiling instruction set.

The method then continues to step S32 of FIG. 5, where media data packets are compiled from the media content data and the associated FEC data based on the compiling instructions selected in step S51.

If the media container file also comprises additional information, such as information of file-to-block division, information of a FEC algorithm and/or file property table, the media server can use this additional information in the data packet generation and transmission.

For example, the additional data and preferably information of MIME type, any coding information, size information, etc. useful by the media server can be included or at least announced in the file property table. In a preferred implementation, this property table constitutes a single information or look-up source that can be accessed by the media server for obtaining information required or advantageous in connection with media extraction, data packet compilation and transmission.

Figure 8:
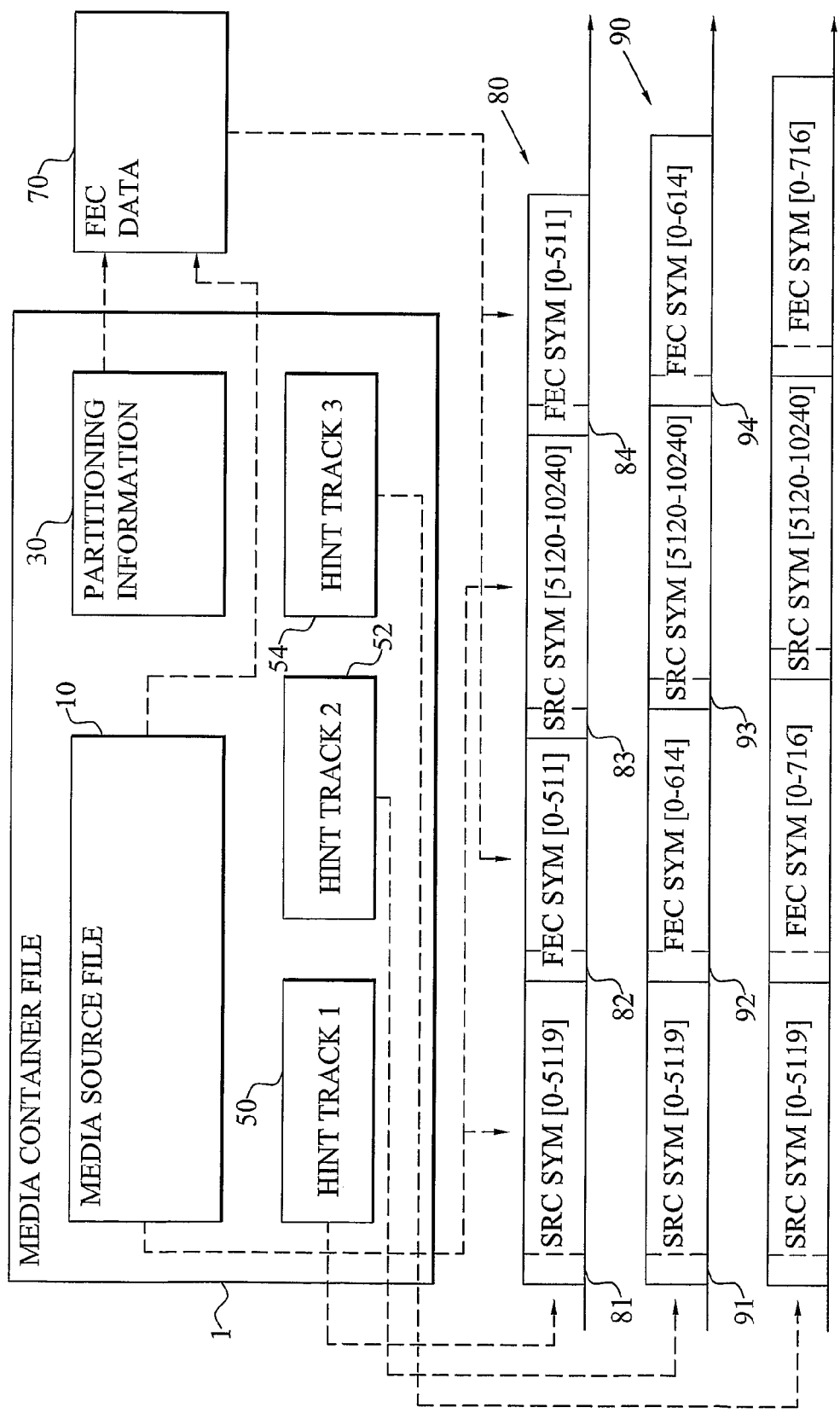
FIG. 8 is a schematic illustration showing compilation of different media streams employing a media container file according to the present invention.

FIG. 8 is a schematic illustration of a media container file 1 according to the invention that is used for showing the use of alternative compilation instructions according to an embodiment of the invention. The container file 1 comprises a media source file 10 preferably comprising multiple media source blocks. In this embodiment, each media source block of the source file 10 has associated partitioning information 30. The container file 1 also comprises, in this illustrative example, three hint tracks 50, 52, 54 containing compilation instructions for different FEC overheads. For example, the first hint track 50 could be used when a 10% redundancy overhead is desired, the second hint track 52 gives a FEC overhead of about 12% and the third hint track 54 gives a 14% FEC overhead. In the figure, the source block construction algorithm suggested in Annex B of the document [5] has been employed.

The partitioning information 10 is employed by a FEC codec for calculating FEC data 70 based on the media source blocks in the source file 10. If the source file 10 comprises multiple media source blocks, multiple FEC data sets or reservoirs 70 are calculated, i.e. preferably one set of FEC data per media source block.

If the first hint track 50 is selected, a first stream of data packets 81, 82, 83, 84 (only one data packet per media source block and FEC block has been indicated in the figure) is generated. However, if instead the second hint track 52 is used, a second stream of data packets 91, 92, 93, 94 is generated. Compared to the first stream 80, the second stream 90 comprises larger FEC blocks, i.e. more FEC redundancy data, per media source block. However, the respective source block contains the same amount of media data in the two streams 80, 90.

Figure 9:
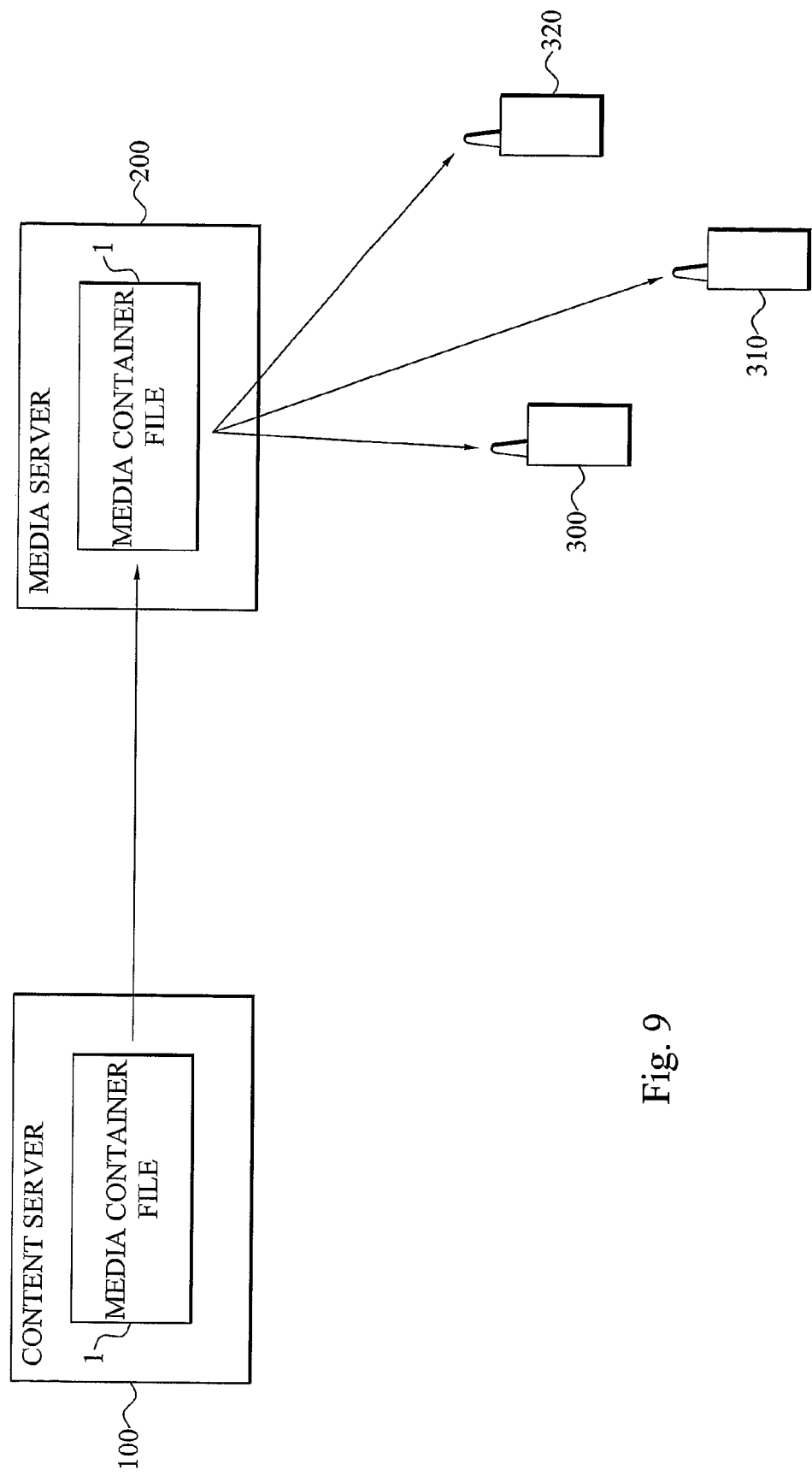
FIG. 9 is an overview of a communications network and including a media server managing a media container file according to the present invention.

FIG. 9 is a schematic overview of a communications network illustrating the parties generating or using the media container file 1 of the present invention. A content server 100 represents the content provider or creator that receives or has access to media source data and constructs a media container file 1. A copy of this container file 1 is sent to a media server 200 that uses the container file 1 in a media session for compiling data packets containing media and FEC data that is transmitted (multicast) to different clients 300, 310, 320 represented by mobile terminals in the figure.

FIG. 10 is a schematic block diagram of a media content server 100 according to the present invention. The content server 100 comprises a general input and output (I/O) unit 110 arranged for and comprising functionality (transmitter/receiver, modulator/demodulator, encoder/decoder) for communicating with external units. This I/O unit 110 is in particular arranged for receiving input media content and for receiving requests for media container files. The I/O unit 110 is also employed by the server 100 when transmitting such container files to other servers in the communications network.

The content server 100 also comprises a container file creator 160 arranged for creating media container files of the invention. The server 100 also comprises a media block provider 130 arranged for providing at least one media source block to be entered in the media container file by a media block manager 161 of the file creator 160. The media block provider 130 provides the at least one input source block from an internal data storage 120 or from the I/O unit 110 receiving the media content from external media sources 400, 410.

The media source block(s) is (are) then forwarded to a block partitioner 140 of the content server 100. This partitioner 140 partitions the input media source block(s) into a number of source symbols, typically multiple such source symbols, based at least partly on information of a FEC algorithm to be applied to the source block for the purpose of calculation of FEC data. The partitioning operation does not necessarily have to physically divide the source block into source symbols. In clear contrast, the partitioning could be a virtual division by assigning different parts of the source block to different source symbols.

The FEC algorithm to be applied to the source block and which could affect the block partitioning, could be a predefined standard FEC algorithm that is consistently employed for media source blocks. Alternatively, the block partitioner 140 or some other unit of the content server 100 selects, from multiple available such algorithms, a particular FEC algorithm to use. In this selection, different input data could be used, such as maximum expected maximum FEC overhead. In a further embodiment, the block partitioner 140 performs multiple alternative partitions of a given media source block based on information of different alternative available FEC algorithms. For example, if the content server 100 has knowledge of the possible FEC algorithms available at the media server, the block partitioner 140 can perform a separate block partitioning for each of the FEC algorithms.

In addition to performing the block partitioning based on the particular FEC algorithm or scheme to be applied to the media source block, the block partitioner 140 could also operate for performing the partitioning adapted to fit the source symbols into data packets that will be employed by a media server during a media session. Thus, packet size, such as UDP packet size, information could be employed by the partitioner 140.

Information of the particular source block partitioning performed by the partitioner 140 is generated by the information generator 150. This information can, as has previously been described, specify which bits of the media source blocks that belong to which source symbols or define a symbol size that is applied to all source symbols of a source block possibly with the exception of the last source symbol that could be of a smaller size.

In the case, the block partitioner 140 performs multiple alternative partitions of a media source block, the information generated by the generator 150 includes data concerning these alternative block partitions.

The partition information is forwarded from the generator to an information manager 162 of the container file creator 160 that inserts the information into the media container file.

A meta data manager 163 of the file creator 160 provides meta data into the container file. This meta data provides an association between the media source blocks organized by the block manager 161 and the partition information organized by the partition information manager 162.

The resulting media container file can then be, at least temporary, stored in the data storage 120 or be transmitted by the I/O unit 110 to a media server.

The units 110, 130, 140, 150, 160, 161, 162 and 163 of the content server 100 may be implemented or provided as software, hardware or a combination thereof. The units 110 to 163 may all be implemented in the content server 100 in a single network node in a communications system. Alternatively, a distributed implementation is also possible and within the scope of the invention. In such a case, different units 110 to 163 of the content server 100 may be arranged in different network nodes but will despite this perform their intended operations as described in the foregoing.

FIG. 11 is a schematic block diagram illustrating an embodiment of the media block provider 130 of FIG. 10 in more detail. In a preferred implementation, the input media content is in the form of a media source file that is provided by a media file divider 132, e.g. from the data storage or I/O unit of the content server. The media source file is forwarded by the file provider 132 to a media file divider 134. This divider 134 splits the source file into one or more source blocks. The divider 134 could base this file division based on different information or parameters. For example, the file division could at least partly be determined based on the FEC algorithm to be applied for calculation of FEC redundancy data. In such a case, the file division 134 preferably has access to information of such FEC algorithm. The divider 134 could then split a media source file into N−1 equally sized media source blocks and one media source block that could have a smaller size than the other N−1 blocks.

A division information generator 136 is arranged connected to the file divider 134. The generator 136 generates information of the file division determined and possibly performed by the file divider 134. In a first implementation, the information generated could specify which bits of a media source file that belongs to different media source block. In a second implementation, the information specifies the (bit or symbol) size of media source blocks, possibly with exception of a last source block that could have a smaller size. In such a case, knowing the start location of the media source file, the different media source blocks can be identified using this (size) division information.

A division information manager 138 is implemented in the block provider 130 for organizing the division information from the information generator 136 into the media container file.

The units 132 to 138 of the media block provider 130 may be implemented or provided as software, hardware or a combination thereof. The units 132 to 138 may all be implemented in the media block provider 130. Alternatively, a distributed implementation is also possible and within the scope of the invention. In such a case, different units 132 to 138 of the media block provider 130 may be arranged elsewhere in the content server.

Figure 12:
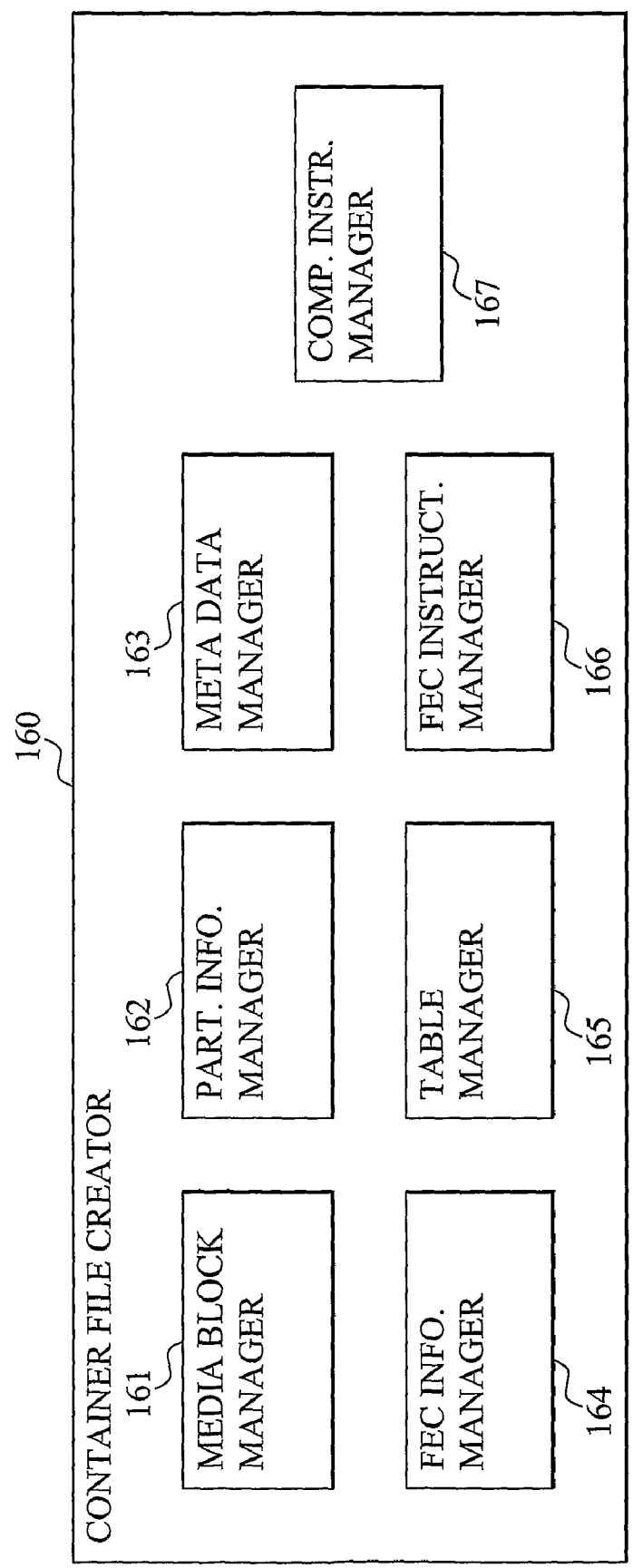
FIG. 12 is a schematic block diagram illustrating an embodiment of the container file creator of FIG. 10 in more detail.

FIG. 12 is a schematic block diagram illustrating an embodiment of the container file creator 160 of FIG. 10 in more detail. This file creator 160 comprises, in addition to the previously described media block manager 161, partition information manager 162 and meta data manager 163, a FEC information manager 164. This FEC information manager 164 generates and organizes, into the container file, information of the FEC algorithm(s) to be applied to the media source block(s) of the container file. The block partitioning performed by the block partitioner of the content server also used such FEC algorithm information when performing the block partitioning. Thus, information of the FEC algorithm(s), based on which the block partitioning have been performed, is preferably generated by the manager 164 and included in the container file.

A table manager 165 may be included in the file creator 160 for generating and including a property table into the container file. This property table could then includes information of the media source file(s) in the container file, such as file type, file size, file storage location, file encryption, file name/identifiers, etc. Also the partitioning information, file division information and the meta data of the invention could be included in the property table generated by the table manager 165.

A FEC instruction manager 166 is included in the file creator 160 for generating FEC instructions to be followed by a media server when generating FEC data based on the media source blocks of the container file. These instructions will then specify, together with the partitioning information associated with the particular media source block, which source symbols that could be input to a FEC codec for calculation of FEC symbols. Different alternative FEC instructions could be provided by the manager 166 for a given source block, where the FEC instructions are adapted for usage in connection with different FEC codec and/or FEC overheads.

A compilation instruction manager 167 of the file creator 160 generates and inserts compiling instructions into the container file. These instructions include information used by media servers for compiling media data from the media source blocks and FEC data calculated using the source blocks and partitioning information. The manager 167 could generate a single instruction or set of instructions per media content in the file. Alternatively, different such instructions adapted for different FEC overheads, different FEC data types and/or different number of radio-based communications channel employed in the media session could be provided by the manager 167 and organized into the container file.

The units 161 to 167 of the container file creator 160 may be implemented or provided as software, hardware or a combination thereof. The units 161 to 167 may all be implemented in the container file creator 160. Alternatively, a distributed implementation is also possible and within the scope of the invention. In such a case, different units 161 to 167 of the container file creator 160 may be arranged elsewhere in the content server.

Figure 13:
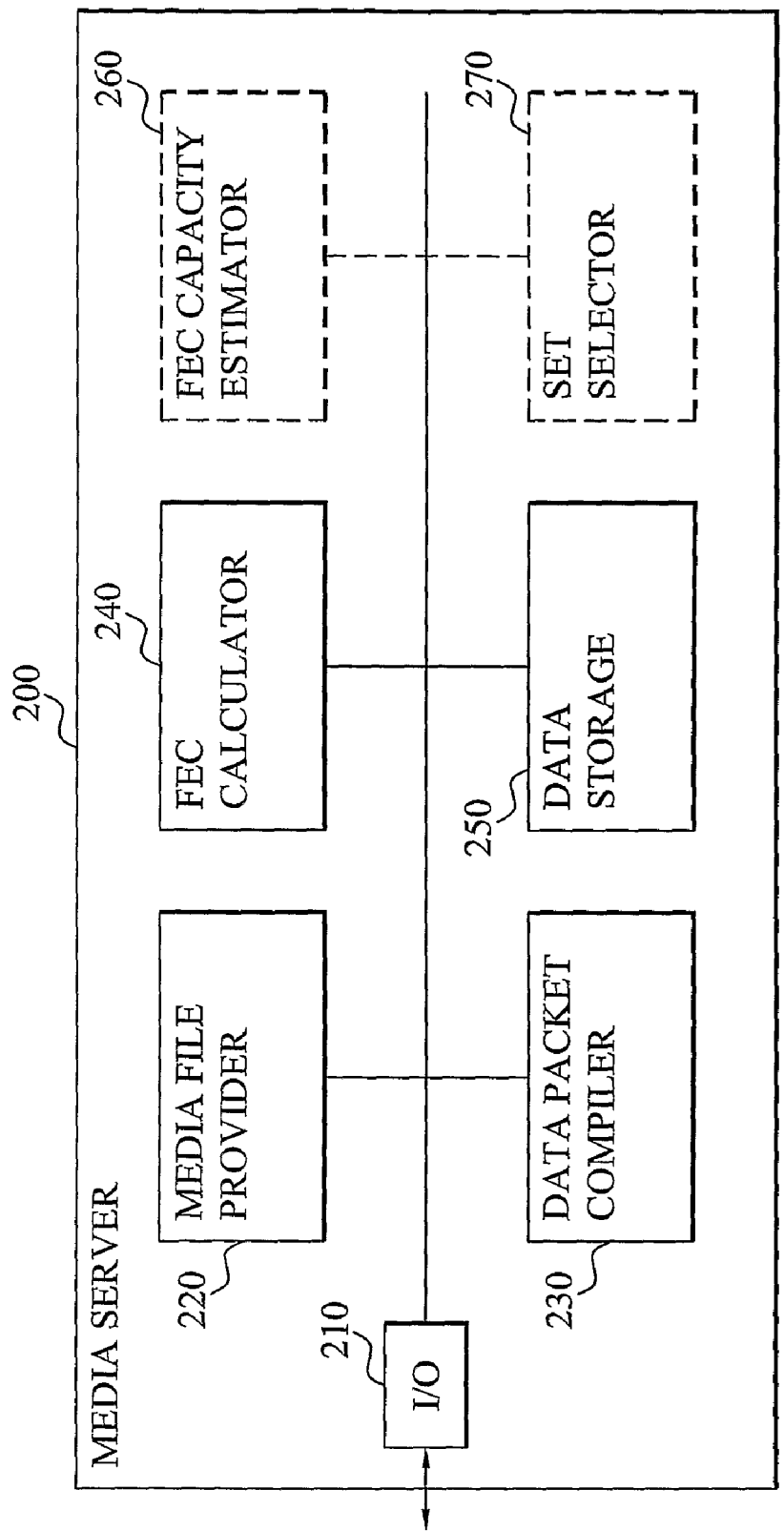
FIG. 13 is a schematic block diagram of a media session server according to still another aspect of the present invention.

FIG. 13 is a schematic block diagram of a media session server 200 according to the present invention. This media server 200 comprises an I/O unit 210 for conducting communication with external units. This I/O unit 210 is in particular arranged for requesting and receiving media file containers from a content server. The I/O unit 210 also receives request for media content originating from different user clients or at least information of to which clients media content should be transmitted. Data packets compiled by the media server 200 are also transmitted by the I/O unit 210 to these clients.

The server 200 comprises a media file provider 220 that provides a media content file to use in the current session. This file provider 220 may generate a request for a particular container file that is transmitted to a content creator by the I/O unit 210. Alternatively, the provider 220 fetches a previously received container file from a data storage 250 provided in the media server 200.

A FEC calculator or codec 240 of the media server 200 calculates FEC redundancy data for at least one media source block stored in the container file. This FEC calculator 240 could use any of the previously mentioned FEC algorithms in this calculation procedure. In a preferred implementation, the container file instructs the calculator 240 of which FEC algorithm to employ if there is a choice. The FEC calculator 240 first identifies the relevant partitioning information for an input media source block. In this identification procedure, the meta data associated with the source block and provided in the container file is used by the calculator 240. The calculator 240 then uses the partitioning information for identifying those portions of the media source block, to which the FEC algorithm (selected based on FEC information in the container file) should be applied for generating FEC data.

In a preferred embodiment, the media container file also comprises FEC calculation instructions that are used by the calculator 240 in addition to the partitioning information when identifying correct input source symbols and performing the actual FEC data calculation. Further input information could be the previously described FEC algorithm information (allows selection of correct FEC algorithm to use) and file division information (allows identification of correct media source block).

A data packet compiler 230 preferably uses compiling instructions included in the container file from the provider 220 to extract media data from the file and FEC data from the FEC calculator to generate data packets containing this extracted data. The so-generated data packets are then transmitted by (streamed or downloaded from) the I/O unit 210.

Different compiling instructions could be included in the file for a given media content. For example, the instructions could be channel-dependent or capacity-dependent. In the former case, the number of available radio-channels and the number of parallel media streams that should be transmitted determines the actual compiling instructions to use by the compiler 230. In the latter case, a FEC capacity estimator 260 is preferably included in the server 200 for estimating a maximum amount of FEC overhead that could be employed during the session. The overhead estimation performed by the estimator 260 is preferably dynamically updated during the session, as the overhead capacity could be changed through the session. A set selector 270 uses the capacity estimations from the estimator 260 for selecting which particular compilation instruction or instructions set of those available in the file to use. The packet compiler 230 then uses this instruction (set) for compiling media data and FEC data into data packets.

The units 210, 220, 230, 240, 260, and 270 of the media server 200 may be implemented or provided as software, hardware or a combination thereof. The units 210 to 270 may all be implemented in the media server 200 in a single network node in a communications system. Alternatively, a distributed implementation is also possible and within the scope of the invention. In such a case, different units 210 to 270 of the media server 200 may be arranged in different network nodes but will despite this perform their intended operations as described in the foregoing.

It will be understood by a person skilled in the art that various modifications and changes may be made to the present invention without departure from the scope thereof, which is defined by the appended claims.

REFERENCES

[1] ISO/IEC 14496-12:2005: "ISO base media file format"
[2] ISO/IEC 15444-12:2005: "ISO base media file format"
[3] International application WO 2005/039131
[4] RFC 3695; Compact Forward Error Correction (FEC) Schemes, February 2004
[5] 3GPP TS 26.346 V7.0.0, 3rd Generation Partnership Project; Technical Specification Group Services and System Aspects; Multimedia Broadcast/Multicast Service (MBMS); Protocols and codecs, June 2006
[6] RFC 2616; Hypertext Transfer Protocol—HTTP/1.1, June 1999
[7] RFC 1864; The Content—MD5 Header Field, October 1995
[8] RFC 3926; FLUTE—File Delivery over Unidirectional Transport, October 2004
[9] RFC 3450; Asynchrononous Layered Coding (ALC) Protocol Instantiation, December 2002
[10] RFC 3451; Layered Coding Transport (LCT) Building Block, December 2002

The invention claimed is:

1. A method of generating a media container file, said method comprising the steps of:
   providing at least one media source block comprising media data;
   wherein said at least one media source block is pre-partitioned into a number of source symbols based at least partly on information of a forward error correction, FEC, algorithm to be applied to said at least one media source block;
   wherein partitioning information descriptive of said partitioning is pre-generated;
   organizing said at least one media source block in said media container file;
   organizing said pre-generated partitioning information in said media container file; and
   providing, in said media container file, meta data providing an association between said at least one media source block and said pre-generated partitioning information.

2. The method according to claim 1, wherein said step of providing said at least one media source block comprises the steps of:
   providing a media source file; dividing said media source file into said at least one media source block;
   generating division information descriptive of said dividing;
   organizing said division information in said media container file.

3. The method according to claim 2, wherein said dividing step comprises dividing said media source file into said at least one media source block based at least partly on information of said FEC algorithm.

4. The method according to claim 1, further comprising the step of:
   providing, in said media container file, information of said FEC algorithm.

5. The method according to claim 1, further comprising the step of:
   providing, in said media container file, a property table comprising storage location information of said at least one media source block within said media container file.

6. The method according to claim 1, further comprising the steps of:
   generating FEC calculation instruction defining calculation of FEC redundancy data based on said meta data, said at least one media source block and said partitioning information; and
   organizing said FEC calculation instruction in said media container file.

7. The method according to claim 6, further comprising the steps of:
   generating compiling instruction defining compilation of media data from said at least one media source block and said FEC redundancy data to form a media stream of data packets; and
   organizing said compiling instruction in said media container file.

8. The method according to claim 7, wherein said step of generating compiling instruction comprises the steps of:
   generating a first set of compiling instruction defining compilation of media data from said at least one media source block and said FEC redundancy data to form a first media stream of data packets having a first level of FEC redundancy overhead; and
   generating a second set of compiling instruction defining compilation of media data from said at least one media source block and said FEC redundancy data to form a second media stream of data packets having a second level of FEC redundancy overhead.

9. A media content server comprising:
   a media block provider arranged for providing at least one media source block comprising media data;
   a media block partitioner arranged for pre-partitioning said at least one media source block into a number of source symbols based at least partly on information of a forward error correction, FEC, algorithm to be applied to said at least one media source block;
   wherein partitioning information descriptive of said partitioning is pre-generated;
   a media block manager arranged for organizing said at least one media source block in said media container file;
   a partitioning information manager arranged for organizing said pre-generated partitioning information in said media container file; and
   a meta data manager arranged for providing, in said media container file, meta data providing an association between said at least one media source block and said pre-generated partitioning information.

10. The media content server according to claim 9, wherein said media block provider comprises:
- a media file provider arranged for providing a media source file;
- a media file divider arranged for dividing said media source file into said at least one media source block;
- a division information generator arranged for generating division information descriptive of said dividing;
- a division information manager arranged for organizing said division information in said media container file.

11. The media content server according to claim 10, wherein said media file divider is arranged for dividing said media source file into said at least one media source block based at least partly on information of said FEC algorithm.

12. The media content server according to claim 9, further comprising:
- a FEC information manager arranged for providing, in said media container file, information of said FEC algorithm.

13. The media content server according claim 9, further comprising:
- a table manager arranged for providing, in said media container file, a property table comprising storage location information of said at least one media source block within said media container file.

14. The media content server according to claim 9, further comprising:
- a FEC instruction manager arranged for
  i) generating FEC calculation instruction defining calculation of FEC redundancy data based on said meta data, said at least one media source block and said partitioning information, and
  ii) organizing said FEC calculation instruction in said media container file.

15. The media content server according to claim 14, further comprising:
- a compilation instruction manager arranged for
  i) generating compiling instruction defining compilation of media data from said at least one media source block and said FEC redundancy data to form a media stream of data packets, and
  ii) organizing said compiling instruction in said media container file.

16. The media content server according to claim 15, wherein said compiling instruction manager is arranged for
  i) generating a first set of compiling instruction defining compilation of media data from said at least one media source block and said FEC redundancy data to form a first media stream of data packets having a first level of FEC redundancy overhead, and
  ii) generating a second set of compiling instruction defining compilation of media data from said at least one media source block and said FEC redundancy data to form a second media stream of data packets having a second level of FEC redundancy overhead.

17. A media session managing method comprising the steps of:
- providing a media container file comprising:
  - at least one media source block, wherein said at least one media source block is pre-partitioned into a number of source symbols;
  - partitioning information descriptive of said partitioning, wherein said partitioning information is pre-generated; and
  - meta data providing an association between said at least one media source block and said pre-generated partitioning information;
- pre-calculating forward error correction, FEC, redundancy data based on said meta data, said at least one media source block and said pre-generated partitioning information;
- compiling data packets by extracting media data from said at least one media source block and said FEC redundancy data; and
- transmitting said data packets to at least one user terminal during a media session.

18. The method according to claim 17, wherein said media container file further comprises FEC calculation instruction defining calculation of FEC redundancy data based on said meta data, said at least one media source block and said partitioning information, and said calculating step comprises calculating said FEC redundancy data based on said meta data, said at least one media source block, said partitioning information and said FEC calculation instruction.

19. The method according to claim 17, wherein said media container file further comprises division information descriptive of a division of a media source file into said at least one media source block, and said calculating step comprises calculating said FEC redundancy data based on said meta data, said at least one media source block, said partitioning information and said division information.

20. The method according to claim 17, wherein said media container file further comprises FEC algorithm information, and said calculating step comprises the steps of:
- selecting a FEC algorithm from multiple available FEC algorithms based on said FEC algorithm information; and
- calculating said FEC redundancy data using said selected FEC algorithm and based on said meta data, said at least one media source block and said partitioning information.

21. The method according to claim 17, wherein said media container file further comprises compiling instruction defining compilation of media data from said at least one media source block and said FEC redundancy data to form a media stream of data packets, and said compiling step comprises compiling said data packets by extracting, based on said compiling instruction, media data from said at least one media source block and said FEC redundancy data.

22. The method according to claim 21, wherein said compiling instruction comprises multiple sets of compiling instruction, where each compiling instruction set is associated with a defined FEC redundancy overhead, said method comprising the steps of:
- estimating a FEC redundancy overhead capacity for said media session; and
- selecting a compiling instruction set from said multiple compiling instruction set based on said estimated FEC redundancy overhead capacity, wherein said compiling step comprises compiling said data packets by extracting, based on said selected compiling instruction set, media data from said at least one media source block and said FEC redundancy data.

23. The method according to claim 17, wherein said media container file further comprises a property table comprising storage information of said at least one media source block within said media container file, and said compiling step comprises compiling said data packets by extracting, based on said property table, media data from said at least one media source block and said FEC redundancy data.

24. A media session server comprising:
- a media file provider for providing a media container file comprising:
  - at least one media source block, wherein said at least one media source block is pre-partitioned into a number of source symbols;
  - partitioning information descriptive of said partitioning, wherein said partitioning information is pre-generated; and
  - meta data providing an association between said at least one media source block and said pre-generated partitioning information;
- a forward error correction, FEC, calculator arranged for pre-calculating FEC redundancy data based on said meta data, said at least one media source block and said pre-generated partitioning information;
- a data packet compiler arranged connected to said media file provider and FEC calculator for compiling data packets by extracting media data from said at least one media source block and said FEC redundancy data; and
- a transmitter arranged connected to said data packet compiler for transmitting, to at least one user terminal during a media session, said data packets compiled by said data packet compiler.

25. The media session server according to claim 24, wherein said media container file further comprises FEC calculation instruction defining calculation of said FEC redundancy data based on said meta data, said at least one media source block and said partitioning information, and said FEC calculator is arranged for calculating said FEC redundancy data based on said meta data, said at least one media source block, said partitioning information and said FEC calculation instruction.

26. The media session server according to claim 24, wherein said media container file further comprises division information descriptive of a division of a media source file into said at least one media source block, and said FEC calculator is arranged for calculating said FEC redundancy data based on said meta data, said at least one media source block, said partitioning information and said division information.

27. The media session server according to claim 24, wherein said media container file further comprises FEC algorithm information, and said FEC calculator is arranged for i) selecting a FEC algorithm from multiple available FEC algorithms based on said FEC algorithm information, and
ii) calculating said FEC redundancy data using said selected FEC algorithm and based on said meta data, said at least one media source block and said partitioning information.

28. The media session server according to claim 24, wherein said media container file further comprises compiling instruction defining compilation of media data from said at least one media source block and said FEC redundancy data to form a media stream of data packets, and said data packet compiler is arranged for compiling said data packets by extracting, based on said compiling instruction, media data from said at least one media source block and said FEC redundancy data.

29. The media session server according to claim 28, wherein said compiling instruction comprises multiple sets of compiling instruction, where each compiling instruction set is associated with a defined FEC redundancy overhead, said media session server further comprises:
- a FEC capacity" estimator arranged for estimating a FEC redundancy overhead capacity for said media session; and
- a set selector arranged connected to said FEC capacity estimator for selecting a compiling instruction set from said multiple compiling instructions sets based on said FEC redundancy overhead capacity estimated by said FEC capacity estimator, wherein said data packet compiler is arranged for compiling said data packets by extracting, based on said compiling instruction set selected by said set selector, media data from said at least one media source block and said FEC redundancy data.

30. The media session server according to claim 24, wherein said media container file further comprises a property table comprising storage information of said at least one media source block within said media container file, and said data packet compiler is arranged for compiling said data packets by extracting, based on said property table, media data from said at least one media source block and said FEC redundancy data.

* * * * *

UNITED STATES PATENT AND TRADEMARK OFFICE
CERTIFICATE OF CORRECTION

| | | |
|---|---|---|
| PATENT NO. | : 8,185,794 B2 | Page 1 of 1 |
| APPLICATION NO. | : 12/160158 | |
| DATED | : May 22, 2012 | |
| INVENTOR(S) | : Lohmar et al. | |

It is certified that error appears in the above-identified patent and that said Letters Patent is hereby corrected as shown below:

In Column 17, Line 29, delete "meida" and insert -- media --, therefor.

In Column 27, Line 20, in Claim 13, delete "according claim 9," and insert -- according to claim 9, --, therefor.

Signed and Sealed this
Eleventh Day of September, 2012

David J. Kappos
*Director of the United States Patent and Trademark Office*